(12) United States Patent
Braeger et al.

(10) Patent No.: US 6,280,313 B1
(45) Date of Patent: Aug. 28, 2001

(54) CATFISH FILLET MACHINE

(75) Inventors: Horst Braeger, Lubeck (DE); Richard P. Scherch, Fort Myers; Frank Gransee, Matlacha, both of FL (US); Holger Jorgan, Westport, MA (US); Ralph Berliner, Gainesville, GA (US)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 09/186,040

(22) Filed: Oct. 21, 1998

Related U.S. Application Data

(63) Continuation of application No. 09/089,915, filed on Jun. 3, 1998.

(30) Foreign Application Priority Data

May 7, 1998 (DE) .............................. 198 20 495

(51) Int. Cl.[7] .................................. A22C 25/16
(52) U.S. Cl. ............................ 452/161; 452/170
(58) Field of Search .................. 452/161, 162, 452/170

(56) References Cited

U.S. PATENT DOCUMENTS

| | | | |
|---|---|---|---|
| 3,319,284 | * 5/1967 | Schlichting | 452/170 |
| 4,336,634 | * 6/1982 | Braeger | 452/162 |
| 4,748,723 | * 6/1988 | Braeger et al. | 452/162 |

FOREIGN PATENT DOCUMENTS

| | | | |
|---|---|---|---|
| 45 467 | 11/1966 | (DE) . | |
| 2833097 | * 3/1979 | (DE) | 452/161 |
| 2912982 | * 10/1980 | (DE) | 452/161 |
| 224207 | * 7/1985 | (DE) | 452/161 |
| 36 32 561 C2 | 5/1988 | (DE) . | |
| 39 15 815 C1 | 11/1990 | (DE) . | |
| 105226 | * 11/1966 | (DK) | 452/161 |
| 466674 | 6/1937 | (GB) . | |

OTHER PUBLICATIONS

Baader® Food Processing Machinery brochure, Whitefish Filleting Machine 184, Feb. 1994, Germany.

Baader® 184 brochure, Whitefish Filleting Machine, Nordischer Maschinenenbau Rud. Baader GmbH+Co. KG, Germany.

Baader® Food Processing Machinery, The fastest way from whole Catfish . . . to h & g with Baader 148 Heading and Gutting Machine, Jul. 1996, Germany.

* cited by examiner

*Primary Examiner*—Willis Little
(74) *Attorney, Agent, or Firm*—Knobbe, Martens, Olson & Bear, LLP

(57) ABSTRACT

A catfish fillet machine for filleting fish, such as a catfish, with ribs extending through the belly flesh up to the skin. The catfish fillet machine includes a pair of scraping tools for dividing the flesh of each fish half into at least two independent segments up to the skin. Advantageously, the belly flesh is stripped from the ribs on both sides, thereby resulting in a minimum wastage of fillet flesh. In one preferred embodiment of the present invention, the catfish fillet machine includes a pelvic fin and bone cutter/remover. A mechanism advantageously stretches the nuggets (belly flaps) of the fish tightly against the scraper knives and cutting support of the scraper tools. A fish saddle which engages and moves the fish along the conveyance path has top rail removably fastened to a base and made of a polymer material softer than the cutting blades.

30 Claims, 26 Drawing Sheets

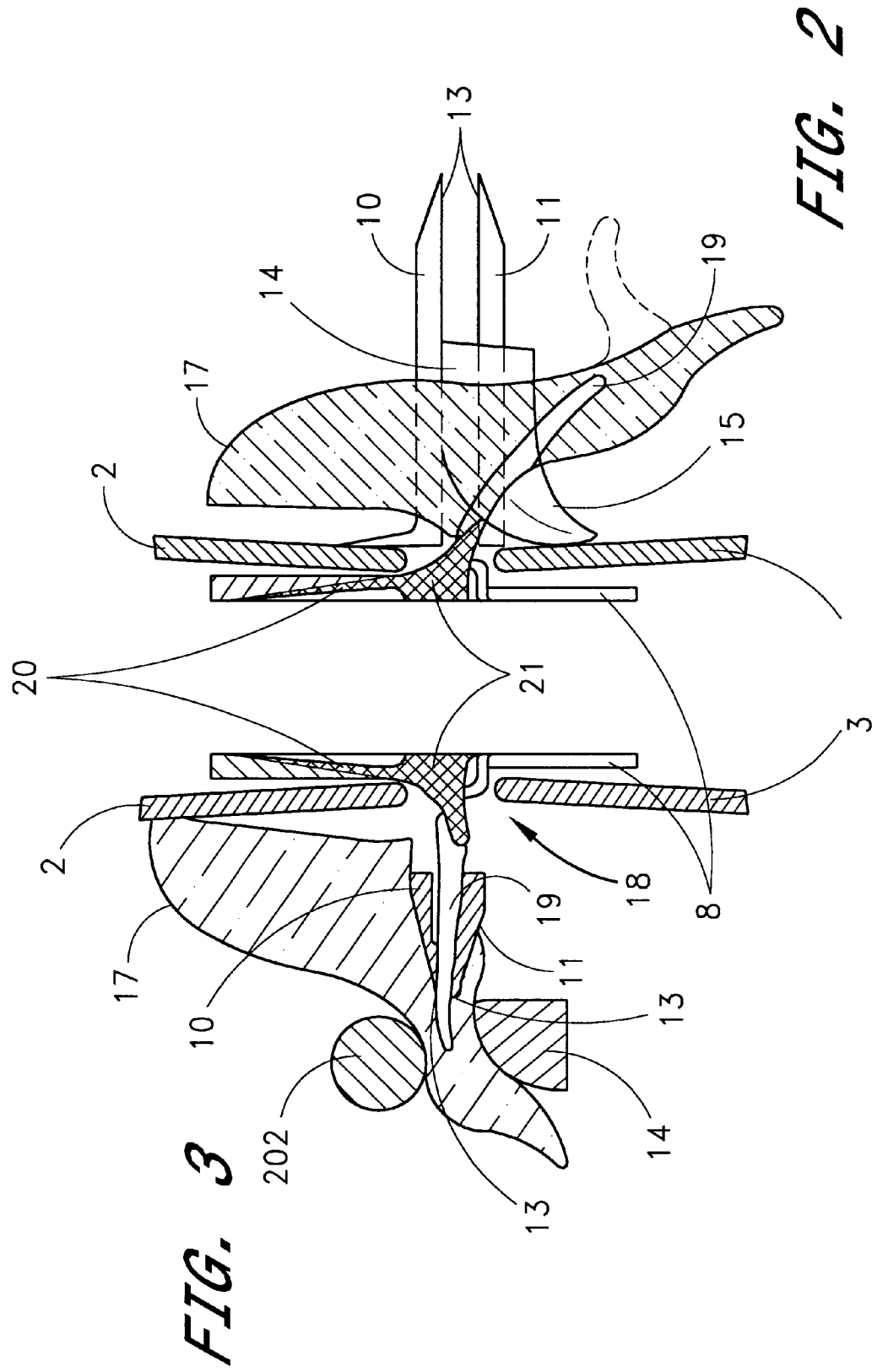

CATFISH FILLET MACHINE

This appln claims benefit of provisional appln 60/104,243 Oct. 14, 1998 which is a continuation of Ser. No. 09/089,915 filed Jun. 3, 1998 now Pat. No. 6,200,211.

FIELD OF THE INVENTION

The present invention relates generally to a device for filleting fish and, specifically, to a machine for filleting fish, such as a catfish, with ribs extending through the belly flesh up to the skin.

BACKGROUND OF THE INVENTION

The invention relates to a device for filleting fish(es) whose ribs have grown into the flesh of the belly, while penetrating same up to the skin, in particular in the case of catfish (Ictalurus Punctatus), with the aid of tools for cutting the fillets away from the belly- and back spines, resulting in belly and back cuts, with guide elements for the lateral guidance of the fish and their spines at a uniform height, with two pairs of scraping blades, each consisting of a pair of scraper blades with cutting edges arranged next to a cutting support and extending in a divergent manner in relation to the conveyance path. The blades in each pair are separated by a gap for the purpose of scraping the fillets away from the ribs and for scoring the fillets between the back fillet and the belly pieces. A conveyor for transports the fish along these tools.

In DE-PS 14 54 089, a scraping tool is indicated in a sequential arrangement of filleting tools in a fish filleting machine. There, the cutting support elements, described as substrates, are provided with a bulge-like edge and are rigidly connected with guide elements gripping into the belly fillet cuts, while the scraping blades, which are described as cutting tools and have a gap between their cutting edges and the substrates, are mounted in a transversely resilient manner and are assigned to bone guides and saddle guides that enter the back cuts to position the fish.

DE-PS 29 46 042 shows an additional scraping tool whose scraping blades, while in the operating position, are assigned to the guide elements that fit into the previously introduced back fillet cuts. The scraping principle applied in practice with these two concepts for the purpose of separating the fillets from the ribs has proven itself many times; however, their use during the processing of fish whose ribs have grown into the flesh of the belly while penetrating same up to the skin, leads to a situation wherein the flesh located below the ribs remains on the skeleton. It is the task of the present invention to automate the removal of the belly flap, to reduce the number of persons needed to process the fish, and to increase the yield of the processed fish.

The prior art also includes a pelvic fin device that has opposing levers spring loaded together. The pelvic fin entered between the ends of the levers and was moved toward a convergence of the levers in a pinching action that clamped the pelvic fin. The levers were angled away from the path traveled by the fish so the pelvic fin was ripped or torn off. This resulted in incomplete removal of the pelvic fin as sometimes the pelvic bone would remain while a portion of the flesh ripped off, sometimes the adjacent cartilage would remain, and the levers would jam with torn pelvic fins and succeeding pelvic fins would slip out of the cutter. Extensive manual removal of the remnants of the pelvic fins was required, and that was costly and inefficient as it resulted in loss of flesh as well as labor to remove the fins. Further, the pelvic fin removal device does not work well with different sizes of fish. The present invention achieves the efficient, consistent removal of the pelvic fin for different sizes of fish within a specific range. This improves the amount of flesh left on the fish, be it the shank, the belly flap or both, and reduces the manual labor needed to remove the pelvic fin.

The prior art also includes bone guides to guide a fish through back knives that cut the flesh on opposing sides of the spine or radial bone. But some fish, like catfish, have a dorsal fin located above an enlarged dorsal bone. The back knives cut through the dorsal bone but that leaves the severed bone attached to the skin and flesh. Manual removal of the severed dorsal bone is labor intensive, and results in removal of more of the fillet than necessary. One aspect of the present invention is directed toward the efficient removal of the dorsal bone to increase the yield of the fillet.

SUMMARY OF THE INVENTION

In accordance with the invention, a decapitated and eviscerated fish is moved tail-first along a conveyance path. The dorsal bone is laterally undercut so that the subsequent use of the back knives sever the dorsal bone tips from the skeleton and largely sever the tips from the fillet. A pelvic fin removal apparatus cuts and tears the pelvic fin off. A pair of scraper blades sever the flesh from the ribs, with an extended lower blade cooperating with a cutting support and a multi-axis positionable tension rod to sever the belly flap up to but not completely through the skin. At this point the fillets are held to the fish skeleton by a small strip adjacent the tail, and a pair of severing knives sever this connection. The severed fillets are carried by a conveyor to a skinner which removes the skin, leaving a skinned shank and a skinned belly portion or nugget for each fillet.

The present invention advantageously allows the automated removal of the dorsal bone. The prior art cutters include back cutting knives that cut along the backbone of the fish on opposing sides of the spine or radial bone toward the vertebral column or center bone. But that leaves portions of the dorsal bone attached to the fillet. Manual removal of the dorsal bone is thus needed, and that results in loss of valuable shank portion of the fillet. Manual removal is also expensive not only because of the labor costs involved, but because machine removal is much faster. The machine of this invention can process 40 or more fish per minute. That is much more than can safely be done by one person, manually.

Thus, a preferred embodiment of this invention has rotating cutters for cutting laterally below a dorsal bone of the catfish. The later cutting by the back knives results in a severed portion of the dorsal bone being attached to a piece of skin and flesh. When the skin is removed the dorsal bone and severed portion of flesh is also removed. This eliminates the need for manual removal, consistently produces a fillet without dorsal bone or dorsal fin, and increases the usable flesh on the shank.

This is achieved by placing cutters mounted to a bracket. The cutters are driven flexible shafts rotated by a motor/gear box which is in turn mounted to a support. The bracket for each cutter rotates about a pivot point offset from the axis of rotation of cutter. The pivot for each cutter is on an opposing side of the conveyance path of the fish and on an opposing side of the dorsal fin of a catfish passing between the cutters. Thus, each cutter swings inward toward the conveyance path and toward the side of the fish moving along that path. The rotational axis for each cutter is thus generally parallel to the conveyance path, but offset from that path.

Pairs of extendible pistons rotatably connect to the bracket so that extension of the pistons cause the rotating cutters to cut just below the dorsal bone of the catfish as it passes between the cutters. Retraction of the pistons causes the cutters to retract out of the way and thus avoid cutting the fish except when the dorsal bone is present. Advantageously, the pistons, bracket and support provide a three-bar linkage that moves the cutters into cutting position by extending one member of the three-bar linkage. As the fish passes between the cutters, the cutters are timed to swing toward the fish and cut below the dorsal bone. A sensor placed upstream detects a portion of the fish to control the timing of the cutter movement.

Advantageously, the pivots from which the cutters rotate are mounted to a bracket that is in turn mounted to pivot about an axis generally perpendicular to a vertical plane through the path traveled by the fish. This allows the cutters to not only swing inward toward the fish, but to also swing parallel to the path the fish is traveling. This produces a curved cut on the fish beginning at the back of the dorsal bone and extending toward the decapitated end of the fish. If this pivoted support is not provided, the fish has a generally horizontal cut below the dorsal bone which can result in a cut tab of flesh remaining when the dorsal bone and skin are removed. That is unsightly. The curved cut eliminates this tab, and by conforming more closely to the shape of the dorsal bone, can increase the yield of shank flesh.

A further improvement in the bone guides is provided. Generally parallel bone guides support the dorsal fin and the top portion of the catfish around the dorsal fin during cutting. Conventional bone guides extend along the fin, along a top portion of the fish body, and often along a portion of the side of the fish body. For the present invention, the bone guides are shaped so they do not interfere with the cutters during cutting. This removes a portion of the bone guides that would normally extend along the back and sides of the fish. The bone guide can extend for a short distance from the dorsal fin over the top of the dorsal bone, but not far as it will otherwise hit the cutters that swing inward to cut below the dorsal bone. Preferably, the bone guide over the dorsal bone is mounted so that the opposing sides of the guide comprise plates that are resiliently urged together, but with sufficient movement allowed so that the plates can move apart to allow passage of the dorsal fin and dorsal bone.

Advantageously, the dorsal cutting mechanism is connected to a fish guide for the dorsal fin, referred to as the dorsal fish guide. Moreover, the dorsal fish guide and dorsal cutting mechanism are mounted so they can move vertically or float relative to the back of the fish. Thus, as the dorsal fin moves under the dorsal fish guide, the change in the shape of the back of the fish causes the dorsal fish guide to move vertically. This self-positions the fish guide relative to the fish, and self-positions the cutters relative to the fish. This results in the cutters being self positioned relative to the fish and always cutting below the dorsal bone for little fish as well as medium sized and large fish. That reduces the machine complexity, increases machine reliability and reduces maintenance costs. It also increases the yield by automatically adjusting the cutter position to the fish size.

Advantageously, the present invention further incorporates a pelvic fin and bone cutter/remover. Preferably, the cutter is located upstream of the scraper blades and downstream of the back knives. The pelvic fin removal mechanism includes a pair of levers such as a guide lever, and a spring-loaded clamp lever containing a cutting blade. The levers are resiliently urged together. The pelvic fin enters between the levers and is moved toward a convergence of the levers. A cutting blade is located toward the convergence and cuts the catfish's pelvic fin. The levers are angled relative to the path the fish is traveling and the cutting combined with the fish movement causes a cutting and tearing of the pelvic fin from the fish. A mechanism opens the levers to release the severed and torn pelvic fin. Advantageously a jet of air and a stream of water ensure that the pelvic fin falls out of the mechanism to prevent jamming which plagued the prior art devices.

This mechanism allows removal of the pelvic bones and adjacent cartilage without requiring any particular adjustment for a range of fish sizes by using a combination tear-cut mechanism. Thus, within a defined range of fish sizes, the cutter does not require any adjustment. This adaptability and modularity of the pelvic fin and bone cutter/remover desirably leads to higher process efficiency and hence lower operational costs. The cutting and tearing mechanism provides for efficient removal of the pelvic fin and eliminates the need for timely and expensive manual removal downstream. It also results in removal of a consistent and small portion of the flesh, thereby improving the yield of fish suitable for sale.

A further preferred aspect of this invention is an improved scraping tool. This improved tool, like the prior art tools, enters the fillets through a short slit placed on opposing sides of the backbone. The scraping tool comprises a pair of flat, generally triangular scraper blades which are parallel, one resting above the other and leaving a gap between them to allow passage of the ribs of the fish. The scrapers have cutting edges located in the planes of the blades on the edges facing away from the fish skeleton. The cutting edges are designed in such a way that they divide the flesh on opposing sides of the ribs into two independent segments connected by the skin—a shank portion and a belly flap or nugget. This is achieved by extending the length of the lower scraper blade so that it cuts through the flesh toward and up-to the skin, but not through the skin so as to form two separate pieces.

Advantageously, a tensioning support is placed by the extended blade length in order to tension the flesh and achieve a cut entirely through the flesh and up to the skin, but not through the skin so as to separate the fillet into two pieces with skin on each piece. The skin is later removed so that each fillet produces two pieces of flesh without bones, and without skin. Each fillet thus produces a shank portion, and a nugget or belly flap portion. The spring-loaded tension rod is advantageously shaped and positioned to pull the nugget section of the fish tight against the scraper knives or blades, and a base assembly that allows the tension rod to be mounted to the filleting machine and provides means for adjusting the tension rod in the optimum position. Preferably, the base assembly controls the adjustment of the tension rod in three axial degrees of freedom and two angular degrees of freedom.

Further, a cutting support member is placed along the extended cutting edge and below the tensioning member, so the belly flap is trapped between the cutting support and the tensioning member. This further enhances the accuracy of the cut. The scraper blades are advantageously located one above the other and are resiliently urged together at least in the area of their cutting edges. This allows the scraper blades to accommodate ribs of varying sizes and locations without cutting the ribs, while closely cutting the flesh from the ribs to increase the yield.

The advantages which can be obtained from one or more of the extended cutting blade, the tensioning member and the cutting support, are the efficiency with which the belly flesh is stripped from the ribs on both sides. The ribs are in effect removed from the belly flesh with a minimum waste of the flesh, and with an advantageous separation of the flesh. Two separate pieces of flesh on each fillet are produced, a shank portion and a belly or nugget portion. But these two pieces are joined by the fish skin that is later removed. This is done by a machine operation which is repeatable and efficient.

The machine separation produces a consistent cut through the flesh and up to but not through the skin. Prior art scraper knives sometimes cut the flesh but could not produce two pieces held together only by the skin along the length of the cut. As a result, manual separation of the partially cut nugget or belly flesh was required, and such manual separation is inconsistent and costly.

Further, the shank portion of the fillet is more valuable than the nugget or belly portion. Thus, if the separation of the nugget results in removing a portion of the shank, then the value of the resulting fish is reduced. It is desirable to have a large shank and a small nugget, referred to as a high shank to nugget ratio. Manual separation of the nugget from the fillet often results in a larger nugget and a smaller shank, reducing the value of the processed fish. The machine cut results in a consistent cut and a consistent shank to nugget ratio. Moreover, the cut is located to increase the shank portion and reduce the nugget portion, and thus increase the value of the fish. Achieving this mechanically also reduces the labor cost and thus produces an increased yield of fish at a lower cost. Indeed, the machine can process about 40 or more fish per minute.

One preferred embodiment of the present invention further incorporates an adjustable, spring-loaded tension rod that pulls the nugget section of the fish tight against the scraper knives or blades. A base assembly allows the tension rod to be mounted to the filleting machine and provides means for adjusting the tension rod in the optimum position. Preferably, the base assembly controls the adjustment of the tension rod in three axial degrees of freedom and two angular degrees of freedom, although various combinations of the translation and rotation are possible and would work—but not as well.

Preferably, the tension rod has a lower portion positioned adjacent to the lower scraper knife and over the scraper knife cutting support so that as the nugget passes past the scraper knives it is forced between the lower portion of the spring-loaded tension rod and the scraper knife cutting support. The cutting support is shaped with an inclined surface joining an upper and lower surfaces, and the tensioning rod is located adjacent to that incline and along the lower surface opposite the lower scraper blade. Advantageously, this permits the nugget to be stretched and facilitates the cutting process using the lower scraper knife to separate the nugget from the fillet while leaving both parts attached to the skin. Additionally and desirably, the tensioning on the spring-loaded tension rod controls the depth of the cut while the base assembly permits optimum positioning of the tension rod relative to the fish, thereby ensuring that the nugget skin is not cut but the nugget flesh is cut by the lower scraper knife.

Moreover, as mentioned above, current fish processing apparatus include scraper knives that are inserted into a short slit on opposing sides of the backbone to separate the flesh of catfish from the ribs. The revised scraping blades of this disclosure, the tensioning member and the cutting support are such that they can replace the prior art scraping blades. The pelvic fin mechanism and the dorsal bone cutting mechanism can also be retrofit onto existing equipment with some modification to that equipment. In this way, there exists the possibility for retrofitting prior art fillet machines and hence rendering them suitable for more economical processing of the above-mentioned types of fish.

Another preferred embodiment of the present invention further incorporates an improved fish saddle. Typically, conventional fish saddles are a two piece metal weldment consisting of a sheet metal base and a top rail with teeth for engaging the fish. The fish saddle is coupled to the conveying means that transport the fish through the filleting machine. Currently metal teeth are used. When the teeth become worn and dull through use, the fish begin to slip off the saddle causing the various components to work inefficiently or to jam. Disadvantageously, if the teeth on conventional fish saddles become dull and/or damaged the entire two piece welded fish saddle has to be replaced, thereby undesirably adding to the cost. Additionally, should the metal teeth of such saddles impact the various knives and tools of the filleting machine there is the possibility that these knives and tools may be dulled and/or damaged which unwantedly leads to higher maintenance costs and lowers operational efficiency. Some saddles contain replaceable metal teeth that are screwed into a carrier, but unthreading and threading two screws for each fish saddle is very labor intensive. Further, the screws can become loose and if they fall out, can damage the processing machine, or more importantly, embed themselves into the product.

The preferred embodiment of the present invention has a top rail and a base, such that the top rail is removably attachable to the base and the top rail is preferably fabricated from a durable, high strength, chemically resistant plastic. Preferably, the fish saddle top rail includes a plurality of fish engaging teeth and a plurality of pockets, and the fish saddle base includes a plurality of locking tabs which removably lockingly engage the top rail pockets, preferably without the use of metal fasteners.

The fish saddle of the present invention provides several benefits. Advantageously, if any or all of the teeth of the top rail become dull or damaged, the top rail can easily be removed from the base and conveniently replaced by another top rail. This saves on cost and time compared to replacing the entire two-piece welded conventional fish saddle. Additionally, any impact of the teeth of the top rail with the tools or knives of the filleting machine will minimize damage to the tools or knives, since the top rail is preferably fabricated from a plastic material. This desirably lowers maintenance costs and enhances operational efficiency and yield. Moreover, the fish saddle top rail can conveniently be replaced by an alternatively dimensioned and/or configured top rail, as needed or desired. This modularity and adaptability of the fish saddle of the present invention adds to the versatility of the fillet machine.

A further aspect of this invention comprises the timing and sequencing of a variety of processing steps. A decapitated and evicerated fish is moved tail-first along a processing path. Advantageously the dorsal bone under-cutting occurs first, followed by more conventional cutting by the back knives and belly knives to sever the fillets from the backbone on the top and along the belly of the fish—leaving the fish attached to bone by a strip along the backbone. Advantageously though, the back knives move laterally outward when they cut the dorsal bone or dorsal plate as the bone is thick near the spine and dulls the blades. Thus, the back knives are spread laterally so they engage the undercut formed by the dorsal cutters and to cut a thinner portion of the dorsal bone. As the dorsal bone has been undercut and as the lateral movement of the back knives applies forces to the severed portions of the fish, it is desirable to provide resilient dorsal fish guide members to resiliently engage the back and sides of the fish to securely hold the fish during cutting and prevent ejection of the fish, or portions of the fish, from the back knives—especially when the back knives are being moved laterally apart at the dorsal bone.

Next the pelvic fins are removed. Resilient bone guides downstream of the back knives are provided to securely hold the fillets which have been partially severed from the backbone of the fish while the pelvic fin is cut-torn off. After severing, the pelvic fin is removed from the cutter as describe above. The portion of the fish severed from the backbone is allowed to flop down after the pelvic fin is removed. A conventional sickle knife then places a short cut along the juncture of the severed and un-severed portions of the fillet, parallel to the backbone of the fish, just before the ribs begin. The scraping knives are rotated into the path of the moving fish to engage the cut made by the sickle knife. The scraping knives pass on opposing sides of the ribs. The nugget passes between the extended portion of the lower scraping knife and the cutting support and the tensioning rod so the flesh is cut up to the skin to form a shank portion and a nugget portion both connected to the un-severed skin. At this point the fish is connected to the skeleton of the fish only by a short portion of flesh along the tail. A pair of severing knives sever this remaining connection of the flesh to the skeleton. The fillets fall onto a conveyor where they are carried to a skinner that removes the skin and leaves, for each fillet, a skinned shank and a skinned nugget.

The movement of the dorsal fin cutters, the opening and closing of the pelvic fin cutter and spraying of water and air to remove the severed pelvic fin, and the rotation of the severing knives to engage the cut in the fish, are all timed relative to the movement of the fish on the conveyor. Each fish is placed on a saddle, and the movement of the saddle can be determined from the conveyor speed. The machine can process up to and over 40 fish per minute, so the conveyor moves fast, and the cutting components move very fast. The timing of the various parts are largely controlled by rotating mechanical cams and switches cooperating with the operation of the conveyor to coordinate movement. A PLC (programmed logic controller) can also be used to time movement of various components as needed. The operation of some parts, though, depends on the size or position of the fish, such as the dorsal fin cutter. Actuation of these cutters is controlled by the PLC relative to a detector sensing various parameters of the fish.

Advantageously, a detector locates the position of the dorsal fin, and preferably locates the dorsal spike in order to allow the cutters to swing into engagement below the dorsal bone while it is between cutters. Advantageously a laser detector is used to detect the presence of the dorsal fin and place the system on an alert mode, with the passage of the dorsal spike being detected and fed to the PLC, which initiates movement of the dorsal fin cutters.

Preferably, the back knives and belly knives are mounted so they can move toward and away from a vertical plane through the conveyance path. This allows those rotating circular knives to move away from the backbone of the fish to accommodate larger fish, and toward the backbone to accommodate smaller fish. Further, the dorsal fin has a large and hard dorsal plate connected to the fish and has larger dorsal spines, and the back knives can move laterally away from the dorsal bones and away from the thickest part of the dorsal plate to avoid cutting them. Advantageously the back knives spread laterally apart enough so they engage the cut made by the circular knives that undercut the dorsal plate, and sever the tips of the dorsal plates.

There is thus advantageously provided a machine, containing various components and sub-mechanisms, for filleting a fish, preferably a catfish with dorsal bones, ribs through the flesh, and pelvic fins. There is also provided a method of filleting such a fish, with the method steps having steps analogous to the various functions of the apparatus.

Other specific provisions and advantages of the present invention will become apparent from a reading and study of the specification, claims and figures. As will be realized by those skilled in the art the invention is capable of modifications in various respects, all without departing from the scope and utility of the invention as disclosed herein. Accordingly the specification and figures should be regarded as illustrative in nature, and not as restrictive.

BRIEF DESCRIPTION OF THE DRAWINGS

The device of the invention is subsequently explained in greater detail with the aid of drawings, wherein:

FIG. 2 shows a cross-section through the device in the area of the right scraping tool near the tips of the scraper blades;

FIG. 3 shows a cross-section through the device in the central area of the left scraper tool;

DETAILED DESCRIPTION OF THE PREFERRED EMBODIMENTS

Figure 1:
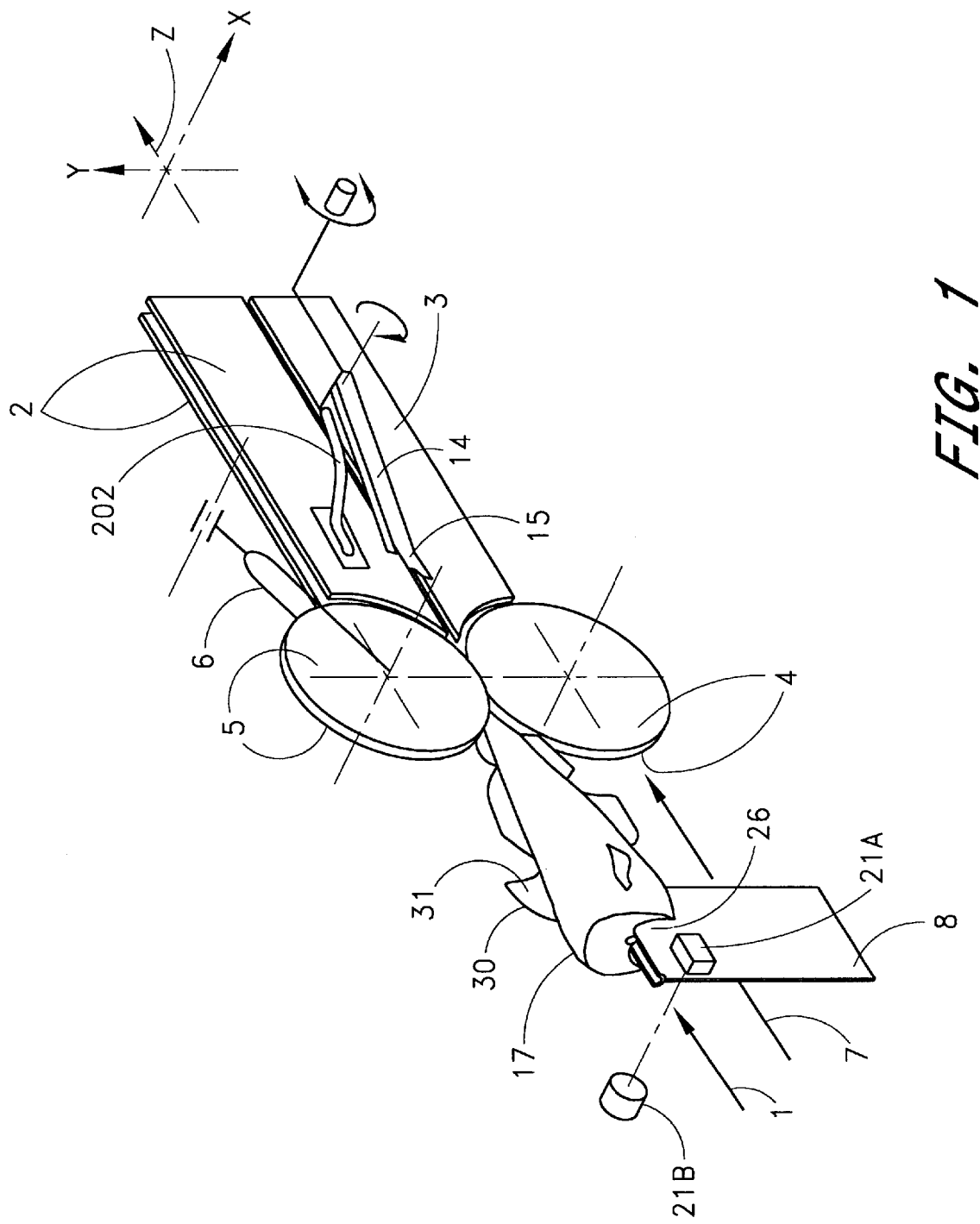
FIG. 1 shows a perspective view of a portion of a fillet machine of this invention.
Figure 15:
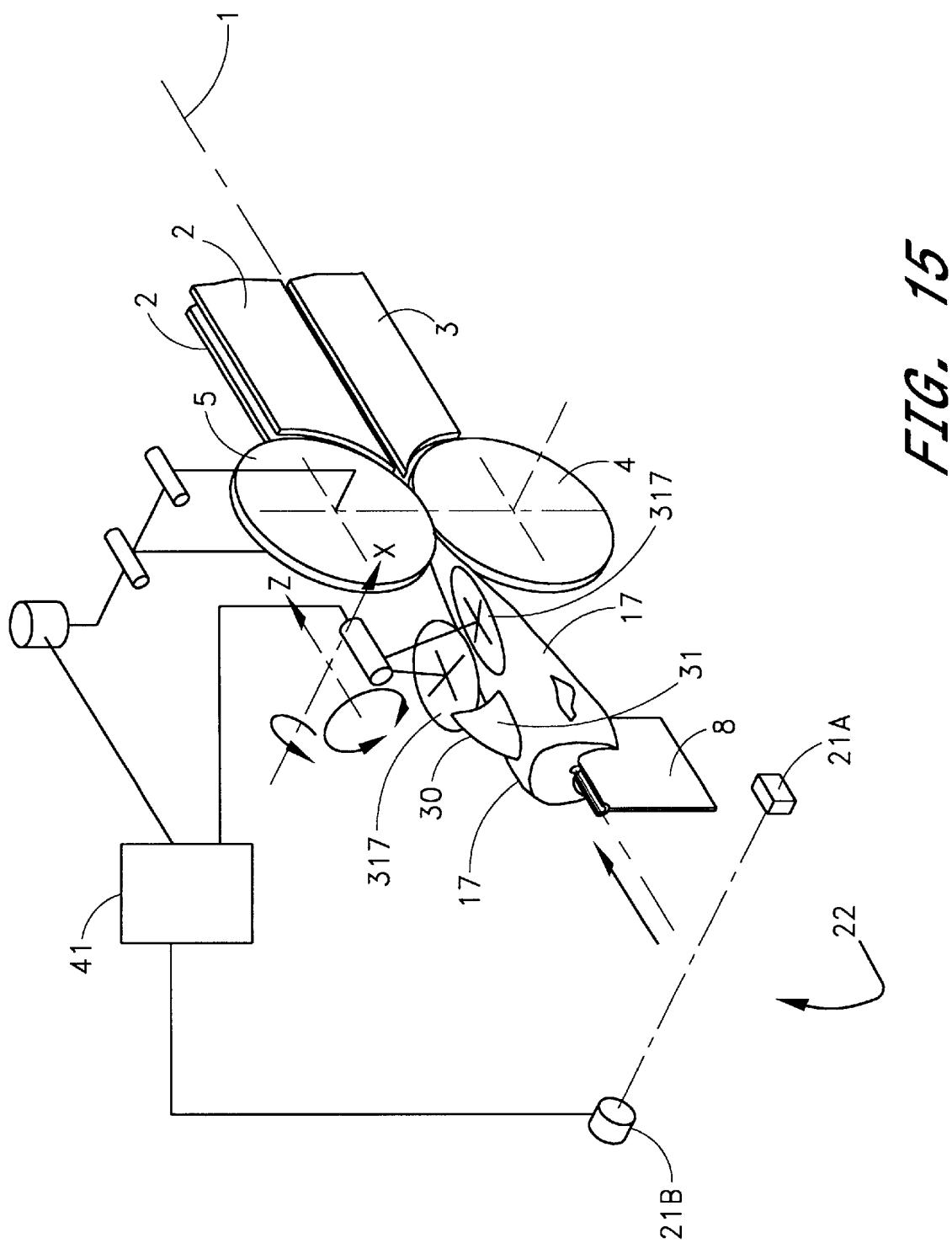
FIG. 15 is a perspective view of a portion of the invention.

Referring to FIGS. 1 and 15, a machine is shown in which a fish 17 is moved along a generally horizontal path 1. For convenience the machine will be described using directions as shown in these Figures, with "up" referring to the direction toward the top of the figure, with "down" referring to the direction toward the bottom of the figure, with the vertical axis referring to the direction in the up-down direction, and with the horizontal plane being orthogonal to the vertical axis. Upstream and downstream will refer to relative locations along the conveyance path 1. This directional orientation is advantageous for the preferred embodiment of this invention, but other orientations are possible which still use the spirit of this invention. Thus, the description of the invention relative to this vertical orientation is not intended to limit the application of this invention or to limit the protection accorded this invention. A decapitated fish 17 opened at its abdominal cavity 26 (FIG. 1) and gutted, and preferably with its tail fin removed, is placed with its abdominal cavity on a push saddle 8 advanced by the endless chain conveyor 7 such that its tail points in the conveyance direction. The spinal column 21 (FIG. 2) of the fish rests on the saddle ridge and the end of the push saddle 8 pointing forward makes contact with the end of the abdominal cavity. An operator places the fish on the saddle 8, forcing it against the saddle to impale it slightly on engaging protrusions on the saddle. Gravity holds the fish against the saddle 8. Thus, the back or top of the fish 17 is vertically upward from the saddle 8, and the ribs 19 of the fish 17 extend downward or below the saddle 8. The ribs 19 (FIG. 2) are also located laterally or outward from the saddle 8.

A pair of bone guides 2 and saddle guides 3 are placed to engage the back and belly fillet cuts of fish 17. At other portions along the conveyance path 1 dorsal fish guides 2a (FIGS. 13 and 14) hold the top of the fish 17. The guides 2, 2a and 3 generally comprise parallel plates separated sufficiently to allow passage of the engaged portions of the fish 17. In some portions of the guides 2, 2a there are shaped lower portions that extend laterally away from the fish to engage and support the back and a portion of the upper sides of the fish. The top part of the guides 2, 2a are spaced to allow passage of the dorsal fins and dorsal spike—which help position and orientate the fish 17 during processing. For the dorsal fish guides 2a, the guides are mounted so they can move laterally apart to accommodate passage of the dorsal bone as described later. Where the dorsal bone is cut, the dorsal fish guides 2a have holes or openings so the cutters do not hit the guides 2a. Located along the conveyance path and below the fish 17, are a pair of saddle guide elements 3.

Referring to FIG. 15, the fish 17 first moves into the area of the measuring unit 22. In the preferred embodiment the measurement unit 22 detects a dorsal spike of the fish detected to control the various process steps. As the fish 17 moves on the saddle 8 the dorsal fin 31 passes between parallel guides spaced apart sufficiently to allow passage of the fin 31 between the guides. Erecting hubs protrude into the space separating the parallel bone guides 2 to offer resistance to the flexible posterior dorsal fin as it passes through the guides. Positioned after the erecting hubs are a series of erecting fingers that ensure the fin stays erected through the fin guiding plates. Within the fin guiding plates is a sensor 21 that senses the flexible extended rays of the dorsal fin 31. Output from the sensor 21 is input to computer 41. The dorsal spike 30 is located at the end of the dorsal fin 31 nearest the decapitated end of the fish 17. As the fish 17 is moving tail first, the dorsal spike 30 is the last portion of the dorsal fin detected by the sensor 21. Thus, when the dorsal fin 31 is no longer sensed the location of the dorsal spike 30 is known. Using the signal from the sensor 21, and based on the travel speed of the saddle 8 and fish 17 on the saddle, the location of dorsal fin cutters 317 relative to the sensor 21, the computer 41 can determine when to start the dorsal fin cutters 317 and any other components of the processing equipment that are electronically controlled.

Advantageously the measuring unit 22 uses an optical sensor, such as a laser emitter 21a and detector 21b. Alternatively, a reflector can be placed where the detector 21b is shown so that the emitter and detector can be located in the same component. Entry of the erected dorsal fin 31 into the path of the sensor beam can give an alert state, and passage of the dorsal spike 30 will result in resumption of the beam to initiate the sequencing of events. Capacitance sensing or mechanical sensing of the dorsal fin can also be used in place of the optical sensor.

Dorsal Fin Cutters

Referring to FIGS. 2 and 3 for the structure of the fish, and to FIG. 15 for the apparatus, a catfish has a bone plate, referred to here as the dorsal bone, adjacent the skin and dorsal fin 31 and extending laterally from the center of the fish. A pair of circular cutting knives 317 are positioned to cut below the dorsal bone on each side of the fish 17, up to, but not through the back spine or radial bones of the fish. The spine or radial bones are used by bone guides 2 to position the fish and the fish skeleton, and thus the back spine or radial bones should not be severed. In a later step, the wider dorsal bone plate is cut through on both sides of the dorsal spike by back knives 5, with the cut planes of the back knives 5 intersecting those of the circular cutters 317, so that the outer parts of the bone plate 28 advantageously fall off and thus accumulate separately from the fillet.

The cutters 317 are mounted so they pivot into engagement with the fish as it passes between the cutters in order to cut from the back of the dorsal bone to the decapitated end of the fish. Advantageously cutters 317 rotate about axes that are generally parallel to the conveyance path 1 of the fish 17 to cut along opposing sides of the dorsal bone up to the spine or radial bones. The cutters then move back away from the fish into a disengaged position and await the next fish. Thus, the cutters 317 are mounted to pivot or rotate about an axis parallel to the conveyance path. The fish 17 can move at a high speed, up to and over 600 mm/sec., so the movement of the cutters 317 is very fast. The cutter movement is advantageously controlled by the computer 41.

The sequential movement of the cutters 317 from the disengaged position, is that the cutters swing inward toward the center of the fish 17, rotating about the Z axis shown in FIG. 15, and preferably also swing from the rear of the fish toward the front—about the X axis shown in FIG. 15. The cutters 317 dwell until the cut is completed and then the cutters open, dwell slightly to ensure the fish 17 is past, and then swing back to the starting position. A total time of about 19 ms is illustrative of the operational speed for a machine processing about 40 or more fish per minute. The precise timing will be determined by the fish size, the saddle speed, and the size of the cutting blade, and is advantageously controlled by the computer 41.

Figure 13:
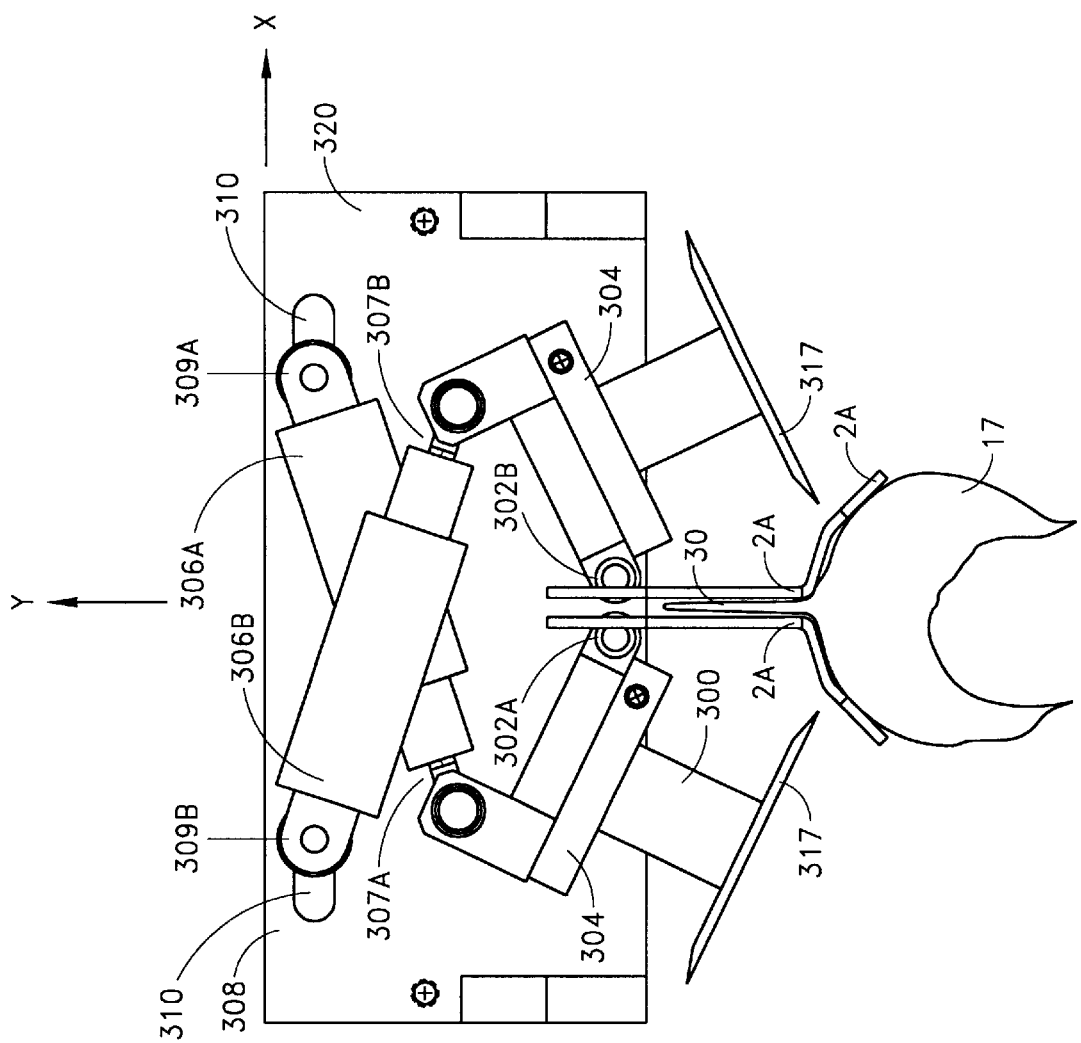
FIG. 13 is a plan view of a dorsal fin cutting mechanism in a disengaged position.
Figure 14:
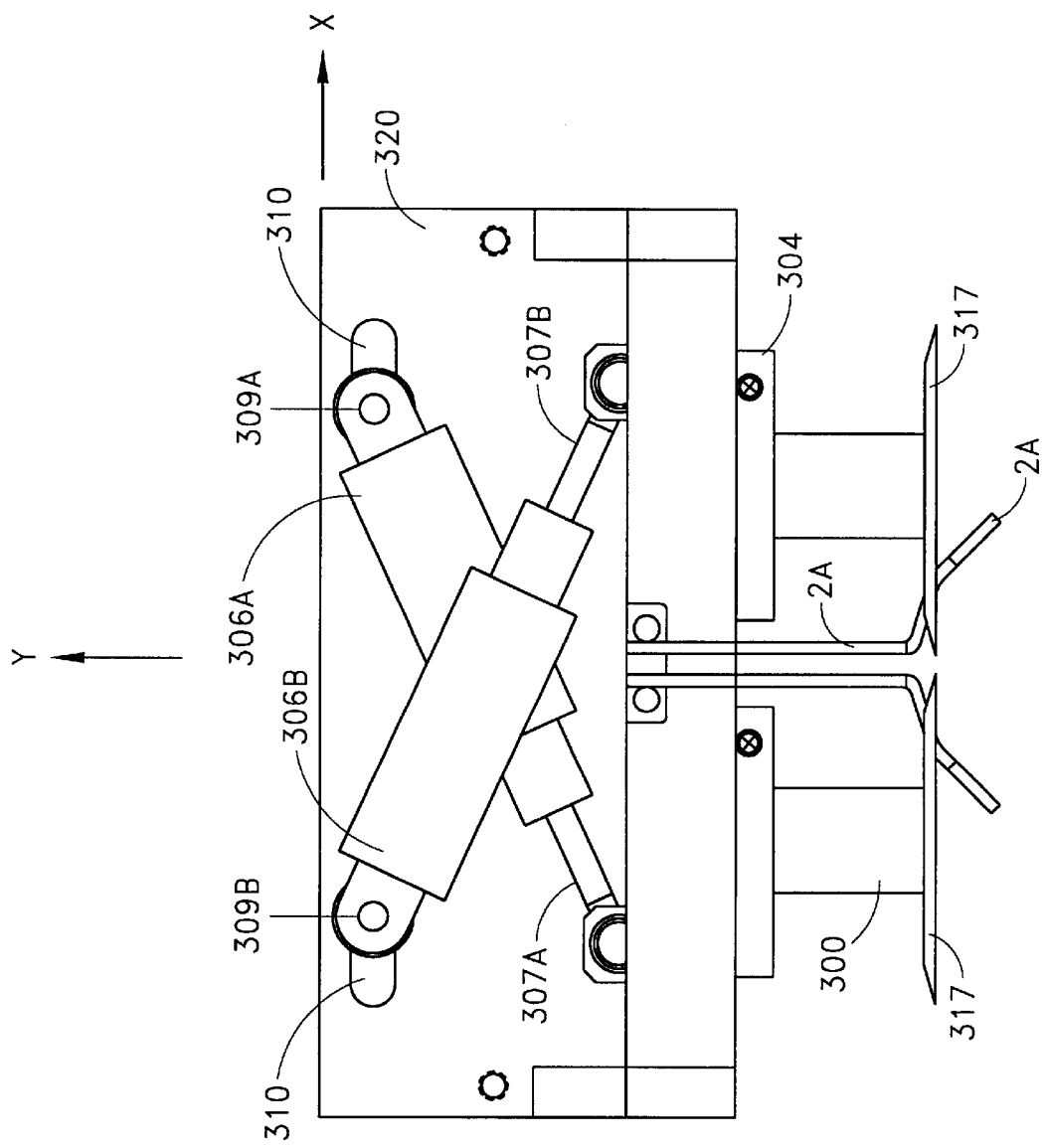
FIG. 14 is a plan view of a dorsal fin cutting mechanism in an engaged position.

Referring to FIGS. 13 and 14, the rotating cutters 317 are shown. Each of the cutters 317 is mounted to the end of a motor 300 (about 0.5 hp) which is in turn mounted to a bracket 304 that pivots about pivot 302a, 302b at one end to rotate about a point offset from the axis of rotation of cutters 317. The pivots 302a, 302b are on opposing sides of the conveyance path and on opposing sides of the dorsal fin of a fish passing between the cutters 317. Extendible pistons 306a, 306b have an extendible end 307a, 307b, rotatably connected to the bracket 304a, 304b, respectively. The pistons 106 may comprise solenoids, linear actuators, or other extensible members. Pistons operating on compressed fluid, such as compressed air, are preferred. Alternatively, the cutters 317 could be connected to a flexible shaft (not shown) rotated by a motor which is in turn fastened to a support, with the parts indicated as motors 300 comprising supports for the cutting blades 317.

An opposing end 309a, 309b of each piston 306a, 306b is rotatably mounted to a support 308, advantageously on the opposing side of the conveyance path as the bracket 304 to which the piston is connected. The opposing ends 309 of the pistons 306 may be adjustably positioned relative to the support 308 by sliding the ends 309 along slots 310, in order to adjust the location of the cutters 317. Once positioned the ends 309 are fastened so they only rotate but do not translate. The pistons 306, brackets 304 and support 308 provide a three-bar linkage that moves the cutters 317 into cutting position by extending one member of the three-bar linkage.

When the pistons 306 are extended as in FIG. 13, the brackets 304 pivot about pivot 302 to rotate the cutters 317 into a position to engage and cut the fish as it passes between the cutters. When the pistons 306 are retracted as in FIG. 14, the cutters do not engage the fish. Generally parallel dorsal fish guides 2a are shown between cutters 317, with the guides 2a having openings to accommodate passage of the cutters 317, and to allow the dorsal fin of a fish to pass between the channels 2a. There is thus provided a means for moving the cutters 17 into engagement with the dorsal fin area of a fish passing between the cutters.

The cutters 317 are mounted to a bracket 320 that rotates about an axis perpendicular to a vertical plane through the path I traveled by the fish 17. This is the X axis in FIGS. 13–15. This allows the cutters 317 to not only swing inward toward the fish, but to also swing parallel to the path the fish is traveling. This produces a curved cut on the fish beginning at the back of the dorsal bone and extending toward the decapitated end of the fish. If this pivoted support is not provided, the fish has a generally horizontal cut below the dorsal bone which can result in a cut tab of flesh remaining when the dorsal bone and skin 25 are removed. The curved cut eliminates this tab, and by conforming more closely to the shape of the dorsal bone, can increase the yield of shank flesh.

The dorsal fish guides 2a shown in FIGS. 13–14 extend over the top portion of the fish, with the cutters 317 entering openings in the guides 2a to cut the fish 17. Advantageously the guides 2a stop above the location where the cutters 317 enter the fish 17.

Advantageously, the dorsal fin cutting mechanism is connected to the dorsal fish guide 2a for the dorsal fin. Further, the dorsal fish guide 2a and dorsal cutting mechanism are preferably mounted so they can move vertically or float relative to the back of the fish 17. The engagement of the back of the fish with the dorsal fish guide 2a pushes the cutting mechanism upward. Thus, as the dorsal fin 31 moves under the dorsal fish guide 2a, the change in the shape of the back of the fish causes the dorsal bone guide to move vertically. This self-positions the dorsal fish guide 2a relative to the fish 17, and self-positions the cutters 317 relative to the fish. This results in the cutters 317 being self positioned relative to the fish 17 and always cutting below the dorsal bone for little fish as well as medium sized and large fish. That reduces the machine complexity, increases machine reliability and reduces maintenance costs. It also increases the yield by adjusting the cutter position to the fish size. There are thus provided self-adjusting means for vertically positioning the cutters 317 relative to the location of the dorsal bone for various sized fish.

Back Knives & Belly Knives

Referring to FIGS. 1–3, the fish 17 advantageously moves next into the area of action of the filleting knives, which contain back knives 5 and belly knives 4, which cut into the fish on both sides of the radial bones or spines 20 on the top portion of the fish, starting from the tail end. Vertically below the back knives 5 are the belly knives 4, which cut into the fish 17 on both sides of the spines on the bottom of the fish, starting from the tail end. The knives 4, 5 cut to, but not through the vertebrae or center bone of the fish. The knives 4, 5 generally comprise circular rotating blades. The knives 4, 5 leave a length of flesh at the tail connecting the flesh to the fish skeleton. Each of the blades 4, 5 comprise a pair of blades generally parallel to the other and separated by a gap. Historically the top or back knives 5 were fixed relative to each other but resiliently mounted so they had some limited lateral movement capability, while the bottom or belly knives were actively moved laterally to allow the saddle to pass between the blades.

In the present invention, and referring to FIG. 15, the back knives 5 are modified so that they can be controllably moved laterally apart and together. Each of the back knives 5 is rotated by a driven pulley on a drive shaft, with the knife 5 mounted at the end of the shaft. A belt driven by a drive pulley on a main rotating shaft rotates the knives 5. A teeter-totter mechanism moves the drive pulley which rotates one of the knives 5 through a driven pulley. By moving the drive pulley, the driven pulley and the shaft to which the driven pulley and circular knife 5 are attached, is moved laterally. The shaft on which knife 5 is mounted is spring loaded toward the vertical plane through the conveyance path and thus when the force on the driven pulley is released the knife 5 resumes its normal position. The back knives 5 are normally spaced about 4 mm apart, but can separate up to about 24 mm, about 12 mm movement by each blade. Other mechanisms can be used to laterally move the back knives 5 apart, including gears, linkages, linear actuators, fluid actuated pistons, any of which can be connected to a flange on the rotating shaft on which the knife blade 5 is mounted to move the shaft and knife laterally. These various mechanisms provide a means to controllably move the back knives 5 laterally apart.

The widening allows passage of the dorsal plate which is wider than the spine of the fish. Further, the widening allows passage of the thickest and hardest part of the dorsal plate as cutting it would dull the blades more quickly. Preferably, the back knives 5 move apart enough to engage the undercuts formed below the dorsal plate by cutters 317, and sever the thinner tips of the dorsal plate rather than the thicker portion adjacent the spine. Advantageously, the back knives 5 are also mounted in a rocking arm 6 (FIG. 1) along the planes of the bone guides 2 in a displacable manner so they can be selectively rotated into engagement with the fish 17.

Preferably, the bone guide 2 also widens to allow passage of the dorsal plate and dorsal spike—to avoid jamming in the bone guide 2. The movement of the bone guides 2 can be separately controlled by a motor, linear actuator, solenoid etc, but advantageously the bone guides 2 are mechanically connected to open and close with the back knives 5. This provides a continuity of movement between the components. Indeed the bone guides 2 could have an end portion resiliently urged against the sides of the rotating back knives 5 if the wear is permissible. The bone guide 2 is resiliently mounted to allow the back knives 5 to open and to allow for passage of the dorsal bone of the fish 17.

FIG. 15 reflects a separate motor controlled by computer 41 controlling the lateral movement of the back knives 5. But preferably the motion of the back knives 5 is controlled by a cam mechanism coordinated with the position of the saddle 8 carrying fish 17.

Figure 16:
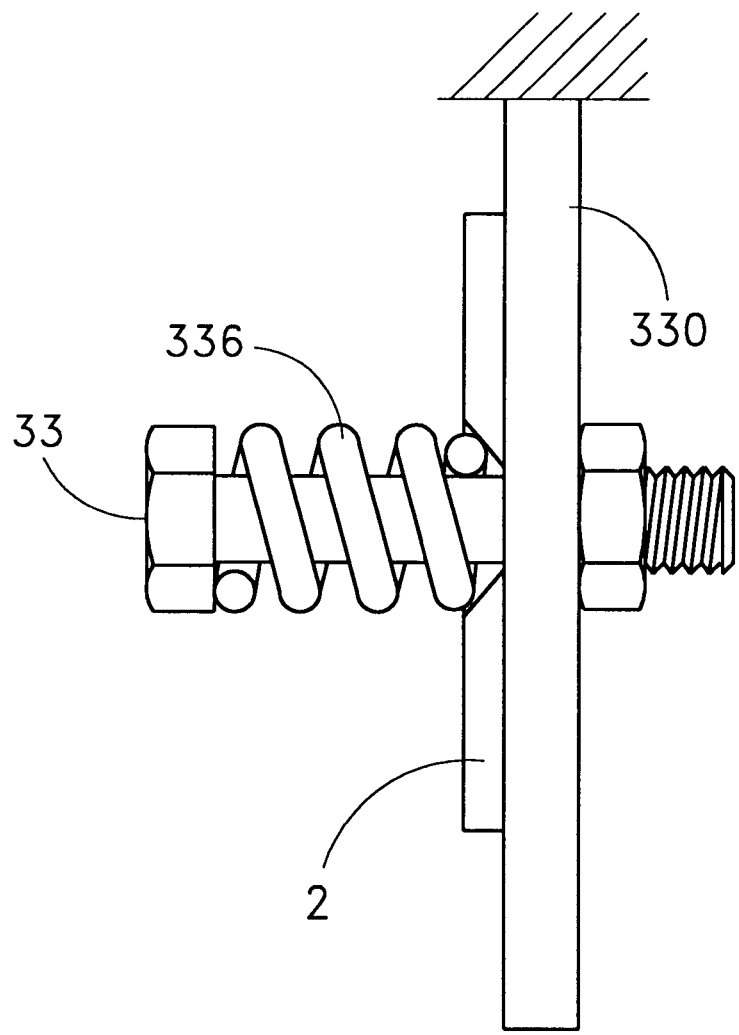
FIG. 16 is a partial sectional, side view of a resilient guide mounting.

Advantageously, the bone guides 2, and even the saddle guides 3 are resiliently mounted to allow lateral movement. Referring to FIG. 16, normally, the guides are fastened by threaded fasteners to a stationary support structure 330 above and below the conveyance path 1. By placing a spring 332 between the head of the threaded fastener 334, or between the support 330 and the guide 2 or 3, a resilient mount can be provided. Advantageously, the guides 2, 3 are spring loaded toward the support 330 by a threaded fastener such as a bolt 334 extending through a hole in the guide and support. Preferably the hole is countersunk to help center the spring 336. The countersunk hole also provides clearance allowing the bone guide 2 or saddle guide 3 to pivot about the fastener. As the bone guide 2 moves outward and tilts or rotates the spring 336 compresses and allows movement, resiliently urging the guide against the fish and toward a narrow, rest position.

Pelvic Fin Cutter/Remover

Figure 9A:
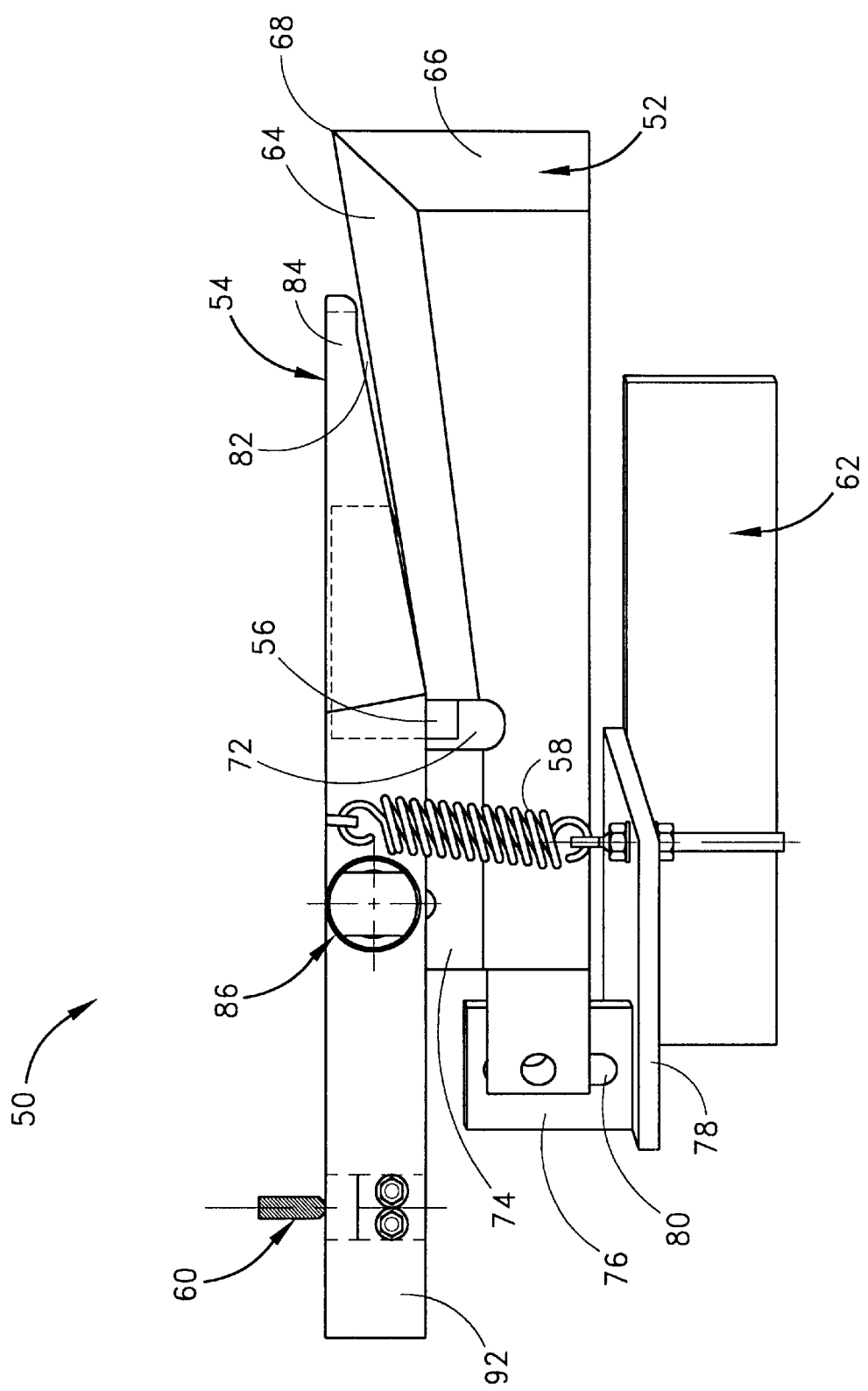
FIG. 9A is a side elevation view illustrating one side of a pelvic fin cutter constructed in accordance with one preferred embodiment of the present invention.
Figure 9B:
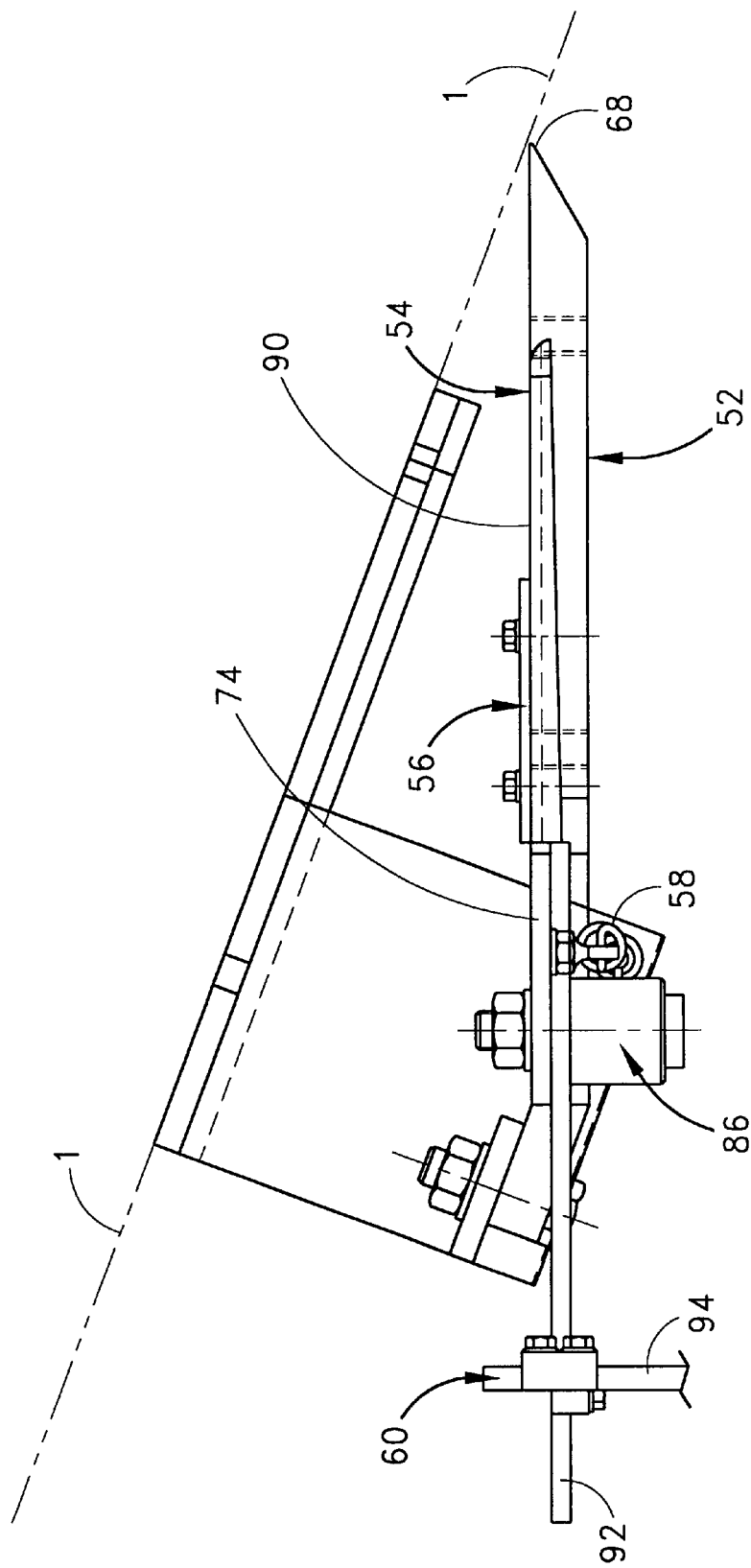
FIG. 9B is a top plan view of the pelvic fin cutter of FIG. 9A.
Figure 9C:
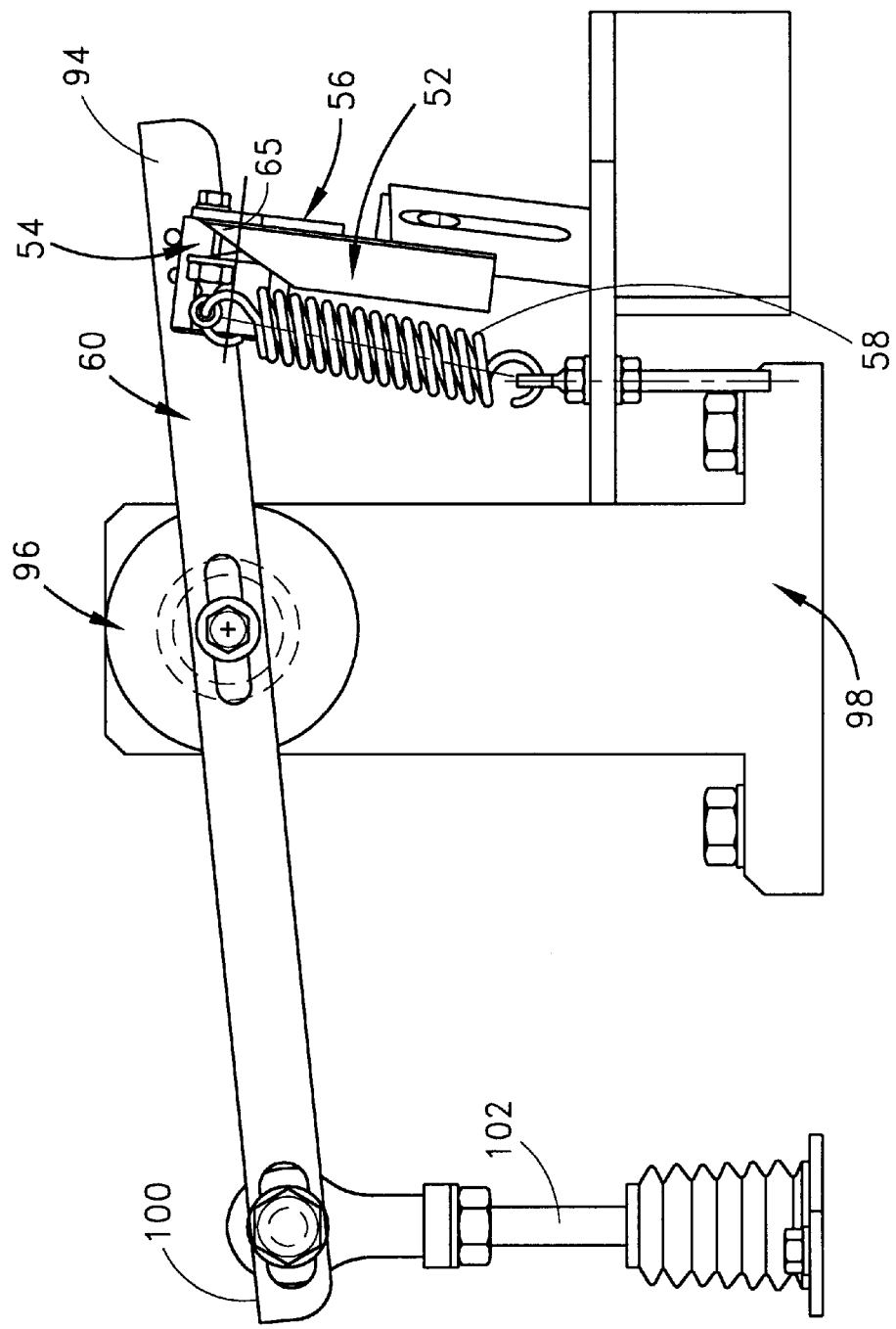
FIG. 9C is a front end view of the pelvic fin cutter of FIG. 9A.

Referring to FIGS. 9A–9C, one preferred embodiment of the present invention further incorporates a pelvic fin cutter/remover 50, which advantageously is placed immediately following the back knives 5 in the processing sequence, although other locations can be used. Since a catfish has a pair of pelvic fins with pelvic bones and cartilage, the cutter 50 is approximately symmetrical with respect to the conveyance path. Thus, for the sake of brevity, only the operator side of the cutter 50 is illustrated in FIGS. 9A, 9B and 9C, though those skilled in the art will be aware that the non-operator side is generally similar. The operator side is the side of the machine from which fish are loaded onto the machine, and the side on which the controls are located—particularly the on-off controls.

Preferably, the cutter 50 is located upstream of the scraper tools 9 and downstream of the back knives 5. Advantageously, the cutter 50 removes the catfish's pelvic fins and pelvic bones without requiring any particular adjustment for a range of fish sizes by using a combination tear-cut mechanism which will be discussed at greater length herein. By mounting the pelvic fin cutter on a plate that can be moved and fastened to the machine frame, the entire cutter 50 can be moved laterally relative to the conveyance path. This movement can accommodate different ranges of fish, for example small fish from about 1 to 1.5 pounds, medium fish from 1.5 to 3.5 pounds, and large fish from 3.5 to 4.25 pounds and over can be processed. It is believed preferable to have the fish sized in ranges of about 1.5–2.5 pounds, from about 2.5–3.5 pounds, and over 3.5 pounds. Within a defined fish size range the cutter 50 does not require any adjustment. This adaptability and modularity of the cutter 50 reduces the need for manual removal which in turn reduces labor costs and increases yield compared to the inefficient manual removal of the pelvic fin.

Referring to FIGS. 9A, 9B and 9C, preferably, the pelvic fin cutter 50 includes a lower guide lever 52, an upper clamp lever 54 and a cutting blade 56. The guide lever 52 is a generally rectangular shaped bar with a top inclined surface 64 and an inclined surface 66 near its end 68. The guide lever 52 is angularly offset from the conveyance path 70 of the fish such that the guide blade end 68 is aligned with the conveyance path 70, as can best be seen in FIG. 9B. The guide lever 52 extends generally along the length of the conveyance path 1, with the distal end 68 facing upstream. The length of guide member 52 extends at an angle or diagonal relative to the length of the path 1, as best seen in FIG. 9B. The amount of angle can vary with the particular design, size of fish, speed of travel, and orientation of the blade 52. An angle of about 15–25° from the conveyance path is believed suitable, with an angle of about 20° being preferred.

The guide lever 52 should be sturdily mounted as it helps tear the pelvic fin from the fish, and movement of the lever 52 can allow the pelvic fin to slip out of the mechanism. The lever 52 can be made sturdily to prevent unwanted movement, or it can be more flexible but braced to prevent movement.

Preferably, the guide lever 52 further includes a recess 72 which accommodates at least part of the cutting blade 56 and a connecting plate 74 which couples the guide lever 52 and the clamp lever 54. The guide lever 52 is mounted via a mounting plate 76 which is connected to a support 78 which in turn rests on a holder 62, thereby securing the guide lever 52 in a fixed position. Preferably, the guide lever 52 is bolted to the mounting plate 72 which has a slot 80 to receive the bolt, not shown, in a variety of positions. Advantageously, this permits the guide lever 52 to be aligned in the optimum position, and hence permits fine tuning of the pelvic fin cutter 50, as needed or desired. The guide lever 52 is preferably longer than the clamp lever 54, and has an upper surface that is inclined downward relative to the generally horizontal conveyance path 1, at an angle of about 6–12°, and preferably at an angle of about 9°.

Still referring to FIGS. 9A, 9B and 9C, the cutting blade 56 is attached to the interior surface 90 of the clamp lever 54, the surface that is toward conveyance path 1. The blade 56 extends in a generally downward direction relative to conveyance path 1, and is aligned at the same angle as clamp lever 54 relative to the conveyance path 1 of the fish. The blade 56 is shown with a trapezoidal shape forming a downwardly inclined cutting edge, as best seen in FIGS. 9A and 9C. Any shape blade can be used, but the cutting edge is preferably located as shown and described. The cutting blade 56 is located between the clamp lever end 84 and the pivot 86, with the cutting edge of blade 56 extending along the closed end of the narrowing portion of the V-shaped space 82 formed between lever 54 and guide member 52. Preferably, the cutting blade is removably attached to the clamp lever using threaded fasteners such as screws, though alternate attachment means may be employed with efficacy so that the blade 56 can be replaced as it becomes dull from use.

The lever 54 (and blade 56 connected thereto) and guide member 52 are resiliently urged toward each other. But the blade 56 is mounted to the lever 54 so the blade 56 slides along an interior surface of guide member 52 somewhat like a pair of scissors blades. But one blade of the scissor (lever 54) is mounted to more easily rotate about pivot 86 than the other blade (member 52).

As seen in FIG. 9C, at the location where the blade 56, lever 54 and guide member 52 are located, the guide member 52 has an inclined surface formed by top inclined surface 64 that extends between two flat, parallel surfaces of the guide member 52. The inclined surface 64 forms a pointed edge 65. The clamp lever 54 has an inclined surface abutting surface 64. The inclined surface of clamp lever 54 is inclined relative to cutting blade 56 to form a notch therebetween. The pointed edge 65 fits into that notch to help form a cutting or shearing action as the blade 56 moves along guide member 52.

Referring to FIGS. 9A, 9B and 9C, preferably, the clamp lever 54 is disposed generally above the guide lever 52 to define a generally V-shaped opening 82. The clamp lever 54 is a generally elongated bar with an end 84 that is located downstream of the guide blade end 68, as can best be seen in FIGS. 9A and 9B. The end 84 of the clamp lever 54 may be curved to facilitate capture of the pelvic fin in the cutter 50. The clamp lever 54 is spring-biased towards the guide lever 52 via an extension spring 58, though other resilient means may be employed with efficacy. A resilient force of about 5–8 pounds, and preferably about 6.5 pounds, is believed suitable. The upper end of the spring 58 is coupled to the clamp lever 54 and the lower end is coupled to a stationary location such as on the support 78, as can be seen in FIG. 9A. The clamp lever 54 is pivotably coupled to the connecting plate 74 via the pivot 86. This allows the end 84 of the spring-loaded clamp lever to move up and down with respect to the guide lever 52, thereby opening and closing the pelvic fin cutter 50. Preferably, the position of the pivot 86 can be adjusted in a slot 88 of the connecting plate 74. Advantageously, this permits the clamp lever 54 to be aligned in the optimum position, and hence permits fine tuning of the pelvic fin cutter 50, as needed or desired.

Referring to FIGS. 9A, 9B and 9C, preferably, the cutting blade 56 is attached to the inside surface 90 of the clamp lever 54 and extends in a generally downward direction towards its cutting edge. Preferably, the cutting blade 56 is spaced between the clamp lever end 84 and the pivot 86. Preferably, the cutting blade 56 is attached to the clamp lever 54 using screws, though alternate attachment means may be employed with efficacy.

Referring to FIGS. 9A, 9B and 9C, and as can be best seen in FIG. 9C, the pelvic fin cutter 50 further includes an opening lever 60 that is connected to, and moves, the clamp lever 54. Lever 60 comprises a generally elongated bar, and has a front end 94 that rests on top of the rear end 92 of the clamp lever 54. The opening lever 60 is aligned at approximately 90° with respect to the clamp lever 54. Preferably, the opening lever 60 is spring-loaded and is pivotable about a pivot 96 which is mounted on a pivot block 98, as can be seen in FIG. 9C. Advantageously, the opening lever 60 and clamp lever 54 are resiliently urged against each other. The base of the pivot block 98 is attached to a platform (not shown) so that the pivot block 98 is stationarily secured at a fixed location. The rear end 100 of the opening lever 60 is coupled to a rod 102 which in turn is connected to an actuating device, such as a solenoid, fluid actuated piston, or cam (not shown) which assists in the operation of the opening lever 60, as will be discussed later herein.

In a first position, the lever 60 acts as a stop for clamp lever 54, with the end of lever 54 being urged against lever 60 by spring 58. In a second position, a solenoid or other mechanism causes rod 102 to move the opening lever 60 which in turn moves one end of clamp lever 54 causing relative movement between cutting blade 56 and guide member 52.

Preferably, the guide lever 52, the clamp lever 54, the cutting blade 56 and the opening lever 60 are fabricated from a durable and corrosion resistant material such as stainless steel, though other suitable metals, alloys, plastics and ceramics may be used with efficacy. Preferably, the spring 58 has a spring constant of about 813 N/m, which is believed suitable, and may be fabricated from a wide variety of materials including high carbon steel, stainless steel and various alloys such as nickel-based alloys and copper-based alloys.

Figure 17:
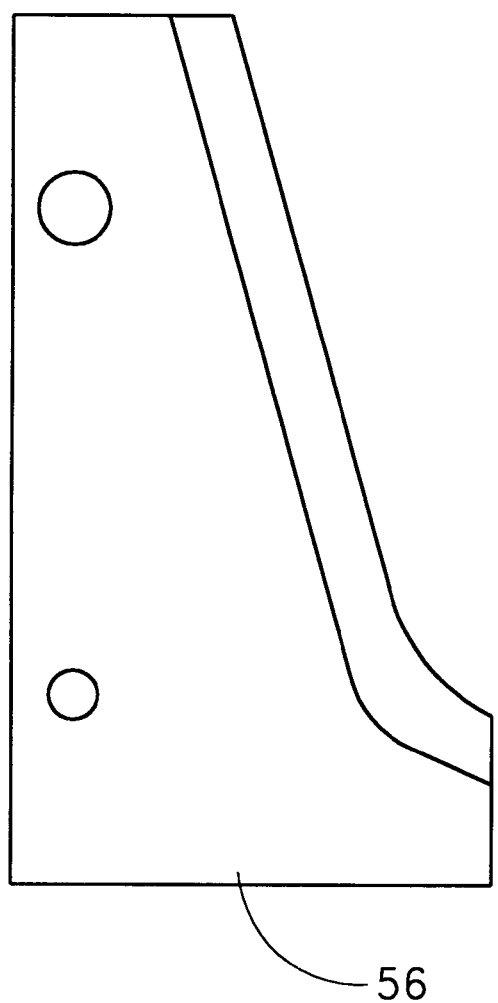
FIG. 17 is a plan view of a cutting blade for a pelvic fin cutter.
Figure 18A:
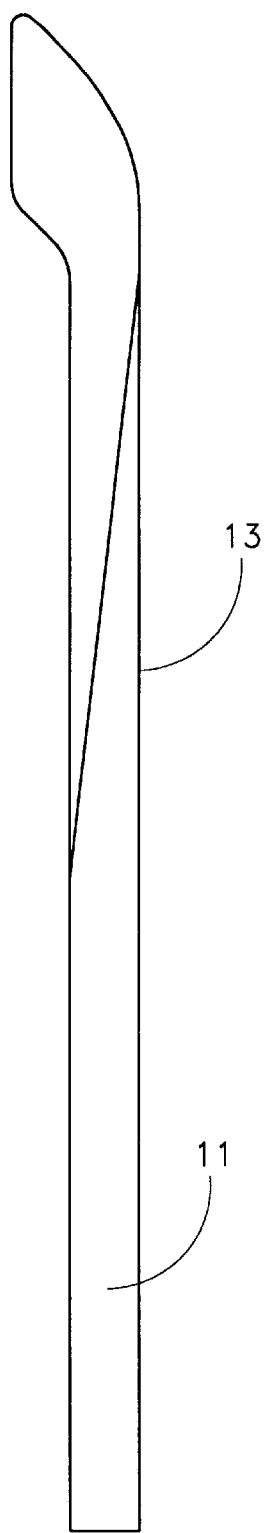
FIGS. 18a–c are side, top and end views, respectively, of a lower scraper blade of this invention.
Figure 18B:
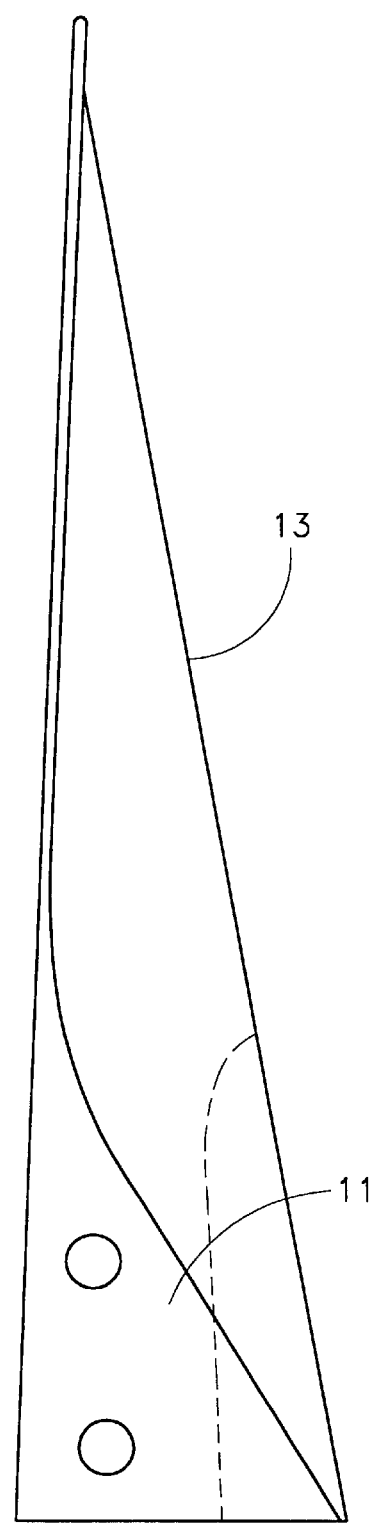
Figure 18C:
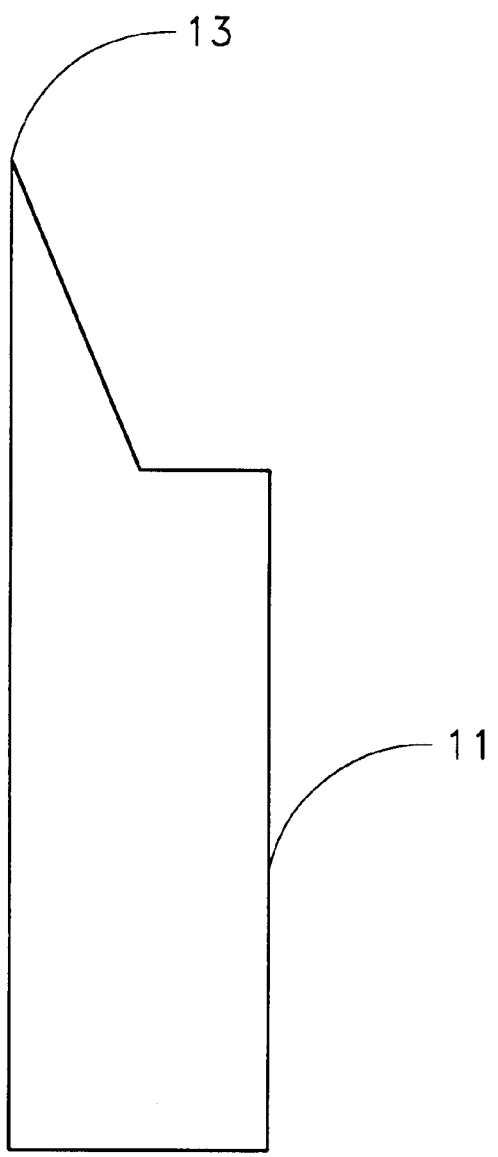

Referring to FIG. 17, blade 56 is advantageously planar, about 3/16 inches (48 mm) thick, about 1.75 inches (4.5 cm) long, and 0.75 inches (1.9 cm) wide at its narrow end and 1.5 inches (3.8 cm) wide at its wide end. The narrow end is located upstream. The cutting edge of the blade extends at an angle θ of about 10–15° relative to a line parallel to a straight side of the blade, and is preferably at an angle of about 12–13°. The angle is slightly greater than the angle of inclination of the upper edge of guide lever 52, so that the blade 56 extends across the gap between levers 52, 54 at an angle to cut the pelvic fin. The downstream end has a radius of about 1.375 inches (6.2 cm) over an arc of about 50° to terminate about ½ inch (1.3 cm) from the wide end of the blade. The curved portion of blade 56 is positioned on guide lever 52 so that it ends just before the notch 72 in the guide lever 52. The curved portion ensures that the pelvic fin is cut as it effectively places a cutting surface across the end of the gap between levers 52, 54, with the curved entrance to that blocking portion enhancing the cutting action if a pelvic fin is forced against the curved portion of the cutting edge. A hardened, stainless steel blade is preferred. Two mounting holes, preferably countersunk, are placed along the straight side of the blade. One hole is about 3/16 inch (0.5 cm) diameter and centered about ¼ inch (0.6 cm) in from the long, straight side of the blade, and about ½ inch (1.2 cm) in from the narrow end of the blade. The other hole is about ⅛ inch diameter (0.3 cm) and is centered about ¼ inch in from the straight side of the blade and about ⅝ inch (1.6 cm) in from the wide end of the blade.

The function of the pelvic fin cutter 50 (FIGS. 9A, 9B and 9C) is to substantially remove the pelvic fins and pelvic bones from the catfish for a range of fish sizes, as mentioned above. In operation, a fish that has been beheaded and gutted, and is slit along its underside is conveyed tail-first towards the cutter 50. The pelvic fins are located on the belly flaps or nuggets and are typically spaced by a few centimeters from the anal vent of the fish. The belly flaps constitute the meat of the fish which is on the underside of the fish and below the ribs. Since, the underside of the fish has been slit, each belly flap having a pelvic fin is disposed on either side of the fish conveyance path.

Referring to FIGS. 9A, 9B and 9C, as the fish, which is being conveyed tail-first, encounters the cutter 50 the belly flap on either side slides over the guide blades, and referring to the operator side of the cutter 50, over the guide lever 52. Advantageously, the inclined surfaces 66 and 68 of the guide lever 52 facilitate this guidance of the belly flap over the guide lever 52. As the fish moves downstream the belly flap gets clamped in the V-shaped opening 82 between the guide lever 52 and the spring-loaded clamp lever 54. Since the pelvic fin extends from the belly flap, the pelvic fin gets positioned adjacent to the clamp lever 54 and on the side of the clamp lever 54 facing away from the main body of the fish. As the fish is conveyed downstream, the tearing of the pelvic fin is initiated since it is caught in the cutter 50. Substantially simultaneously, the force exerted on the clamp lever 54 due to the pulling of the belly flaps by the downstream moving fish causes the spring-loaded clamp lever 54 to open, and hence to allow the belly flap to start slipping out of the cutter 50 while ensuring that the pelvic fin remains caught. As the fish moves further downstream, the cutting blade 56 encounters the pelvic fin and initiates the cutting of the pelvic fin from the belly flap. At this stage of operation, the pelvic fin and bone are both being simultaneously torn and cut from the belly flap, while the belly flap is slipping out of the cutter 50. The recess 72 in the guide lever 52 provides further clearance for the pelvic fin. Further downstream motion of the fish results in removal of the pelvic fin and bone, by a combined tear-cut mechanism, from the belly flap which has slipped out of the cutter 50 and is now substantially devoid of the pelvic fin and bone, thereby minimizing manual labor further downstream along the process line.

The angle of the cutter 50 relative to the conveyance path of the fish causes the pelvic fin to be pulled away from the fish, which increases the cutting effectiveness and also helps tear the pelvic bones and pelvic fin from the fish. The gripping of the fish between the pointed edge 65 of the guide member 52 and the notch formed by the cutting blade 56 and the clamp lever 54 also helps improve the cutting, gripping and tearing of the pelvic fin.

The recess 72 in the guide lever 52 provides further clearance for the pelvic fin, and is advantageously configured to receive the fin. The guide member 52 and clamp lever are angled to urge the pelvic fin toward the recess 72. The recess 72 and the corner end of the cutting blade 56 that overlaps a portion of the recess 72, cooperate to prevent the pelvic fin from being pulled thorough the recess 72. Thus, as the pelvic fin enters the recess 72 the fin is advantageously held so any uncut portion is torn free by continued movement of the fish relative to the trapped, stationary pelvic fin.

Preferably, the pelvic fin cutter 50 of the present invention is suitable for use with catfish in the size range of 1¼ to 4½ lbs, though the scope of this invention permits accommodation of other sizes of fish by adjusting various subcomponents or mechanisms accordingly. It is believed preferable to use the invention with ranges of fish sizes, with the pelvic fin cutter 50 adjusted for each fish size. The sizes are preferably believed to range from about 1.5–2.5 pounds, from about 2.5 to 3.5 pounds, and over 3.5 pounds. Advantageously, the use of a combined tear-cut mechanism in conjunction with the construction of the pelvic fin cutter/remover 50, allows the cutter 50 of the present invention to be efficiently used for a range of fish sizes, Of course, the pelvic fin of a smaller fish will catch in the cutter 50 at a location upstream relative to the location the pelvic fin of a larger fish gets caught, but both pelvic fins will encounter the cutting blade 56, thereby being subject to the cutting blade 56 and the tearing mechanism. This is in part due to the divergence of the guide lever 52 and the clamp lever 54 with respect to the conveyance path 70, as can best be seen in FIG. 9B. This provides an additional mechanism to ensure removal of the fin by tearing any uncut portion from the fish. Both the cutting and tearing mechanisms for removing the fin benefit in part from the divergence of the guide lever 52 and the clamp lever 54 with respect to the conveyance path 1, as can best be seen in FIG. 9B. By resiliently urging the guide member 52 and clamp lever 54 together, the pelvic fin is held while the belly flaps are allowed to pass through without being cut.

Referring to FIGS. 9A, 9B and 9C, after the pelvic fin has been removed from the fish, the spring-loaded and cammed opening lever 60 forces the cutter 50 into the open position where the clamp lever 54 moves relative to the guide member 52 to enlarge the V-shaped space 82. This occurs by the lever 60 pushing down on the rear end 92 of the spring-loaded clamp lever 54. This permits the pelvic fin and bone to be released from the cutter 50. One or more nozzles (not shown) located above the cutter 50 can be used to provide a water spray to further cleanse the cutter 50 from any remaining fin and bone debris. The spring-loaded and cammed opening lever 60 is then forced to close the cutter 50, to await the arrival of the next fish, by pulling up the rear end 92 of the spring-loaded clamp lever 54. Thus, advantageously, the opening lever 60 permits the cutter 50 to be self-cleaning between fish, thereby further reducing manual labor, and hence enhancing process efficiency.

Both the opening and closing are achieved by a solenoid, motor or other mechanism moving rod 102 that is connected to the opening lever 60. The computer 41 could be used to control the motion. Advantageously, the opening and closing is achieved by a cam mechanism mechanically coupled to the saddle speed. Other mechanisms can be used to open and close the cutter 50, such as gear mechanisms, or solenoids connected directly to the one or both of the guide member 52 or clamp lever 54.

Because of the pulling on the pelvic fin, and because the back and belly knives 4, 5 have severed a large portion of the flesh from the fish skeleton, it may be necessary to more securely hold the fillet during cutting. Spring loaded plates resiliently urged against the fish can be added as needed, depending in part on the speed of the conveyor and size of the fish.

Scraper Blades

As the fish leaves the back knives 5 and belly knives 4, the flesh is held to the fish skeleton by a segment of flesh along the backbone at the tail that was not cut by the knives 4, 5. A conventional sickle knife (not shown) moves vertically to place a short cut, usually less than about 2.5 cm., along the juncture of the severed and un-severed portions of the fillet, parallel to the backbone of the fish, just before the ribs begin. The sickle cut is advantageously made after the pelvic fin is removed, but could occur earlier. As in the prior art, a pair of scraping knives 10 are rotated about an axis perpendicular to a vertical plane containing the conveyance path of the moving fish to engage the cut made by the sickle knife. The scraper blades pass on opposing sides of the ribs to sever the ribs from the flesh.

Figure 5:
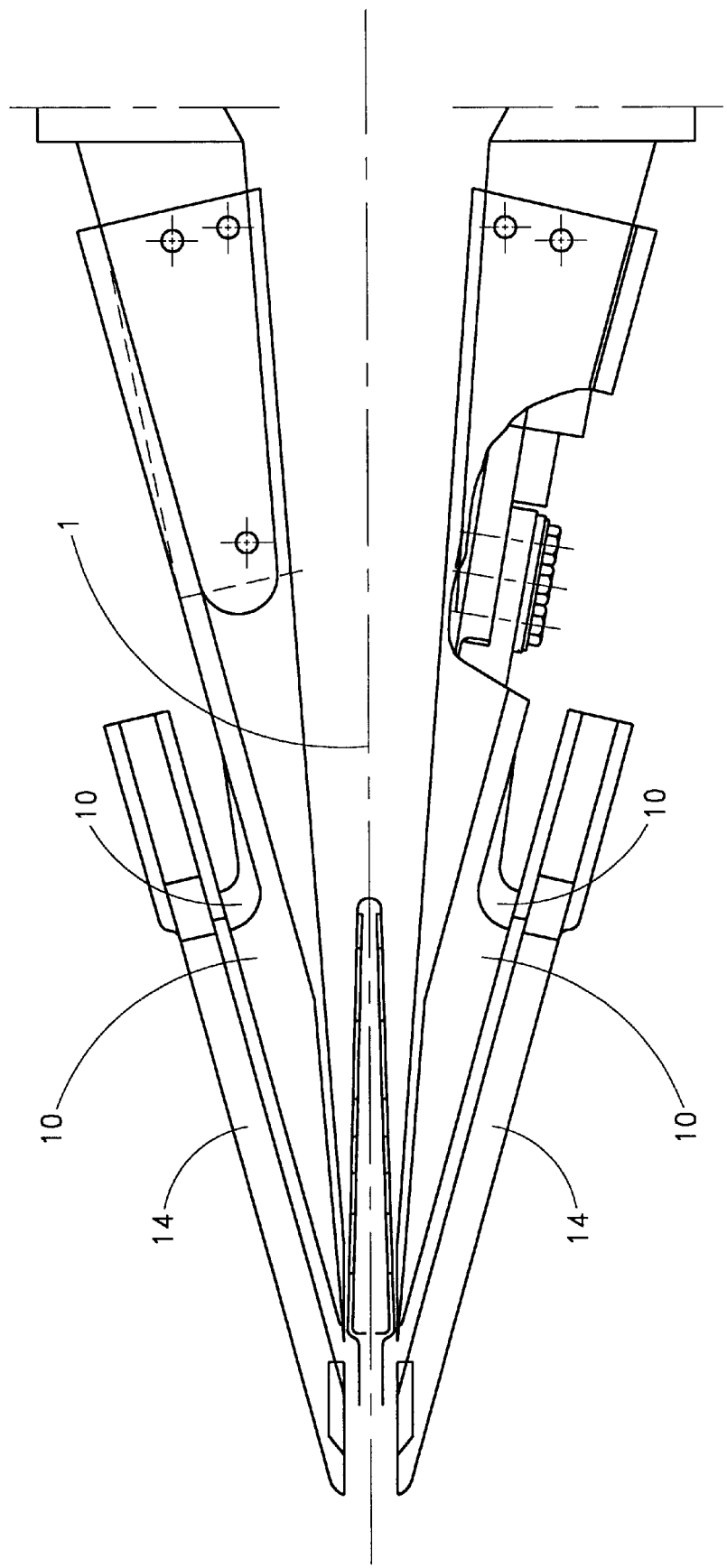
FIG. 5 shows the plan view of a scraper blade with a cutting support element.

Referring to FIG. 5, the pair of scraper blades comprising upper scraper blade and lower scraper blade 10. The blades 10 are generally parallel blades with about the same length and separated by a distance sufficient to allow the ribs of the fish to pass between the blades. Advantageously the blades are resiliently urged toward each other. The blades 10 are generally wedge shaped or triangular in shape, with one side parallel to the conveyance path of the fish, and a sharp cutting edge 13 laterally away from the conveyance path. The downstream ends of the blades 10 are mounted to a support that pivots the blades into engagement with the slit formed by the sickle blade so as to pass the ribs between the blades 10. A cutting support 14 is placed along the cutting edge of the blades 10, with a transition from a thicker portion to a thinner portion occurring near the end of the lower cutting blade. This construction was used in the prior art to score the flesh and provide guidance for later manual removal of the nuggets.

Referring additionally to FIGS. 4, 6 and 18*a–c*, a lower scraper blade 11 of this invention has the cutting edge 13 extended at the downstream end to achieve previously unavailable advantages. The upper scraper blade 10 has a cutting edge about 6 inches (15.25 cm) long, while the length of the lower cutting blade 11 is increased about 50%, an additional 3 inches (7.6 cm). It is believed that lower cutting blades 11 with cutting edges 13 that are from 6.5 to 10 inches, and possibly longer, are suitable. It is believed that lower cutting blades 11 with cutting edges 13 that are from 25% to 75% longer than conventional blades are suitable. The active portion of the upper cutting blade 10 is generally the shape of the lower cutting blade 11, except the cutting edge of the upper blade 10 is about 3 inches shorter. Only the cutting blade 11 is described in detail.

The cutting blade 11 is about ⅜ inches thick (0.95 cm). The cutting edge begins about 1.25 inches from the upstream end of the blade 11 and extends for a distance of about 9 inches (23 cm) along an angled side, while the side adjacent to the conveyance path is about 9.5 inches (24.1 cm) long, with an end about 2 inches (3 cm) wide. The cutting edge 13 has a sharp edge. Depending on the orientation of the blade 13 relative to the other components, the edge may be slightly broken or dulled to avoid severing the skin 25. A pair of counter-bored mounting holes are located along the downstream end of the blade 13, adjacent to the side adjacent the conveyance path.

Figure 4:
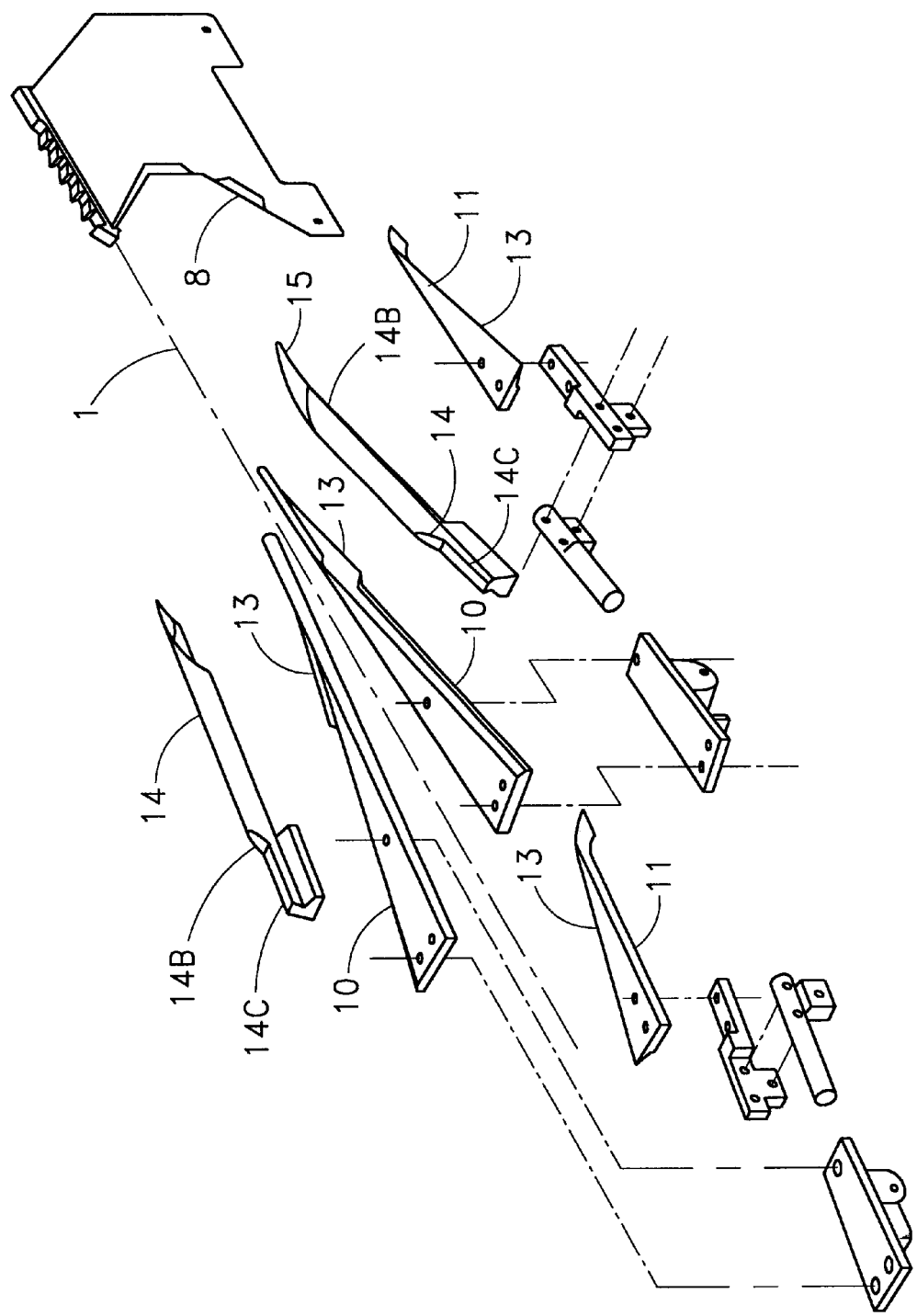
FIG. 4 is an exploded perspective view of a lower scraper blade assembly using the scraper blade of this invention.

Along the side of blade 11 which is located adjacent to the conveyance path of the fish, the lower blade 11 has a ridge extending vertically downward, about ⅛ inch (0.32 mm) wide and the same height as the thickness of the body of the blade except for the upstream end. The upstream tip of the lower blade 11 preferably has a curved end on its lower side, as shown in FIG. 4. The height of the curved end is about twice that as the thickness of the blade 11, with a flat lower edge that is about 1.25 inches long (3.2 cm) and the same width as the ridge which extends downward to form the flat lower edge. The cutting edge 13 blends into, or extends from the upper edge of this ridge about 1.25 inches (3.2 cm) from the tip of the upstream end, at the upper edge of the blade 11.

Figure 6:
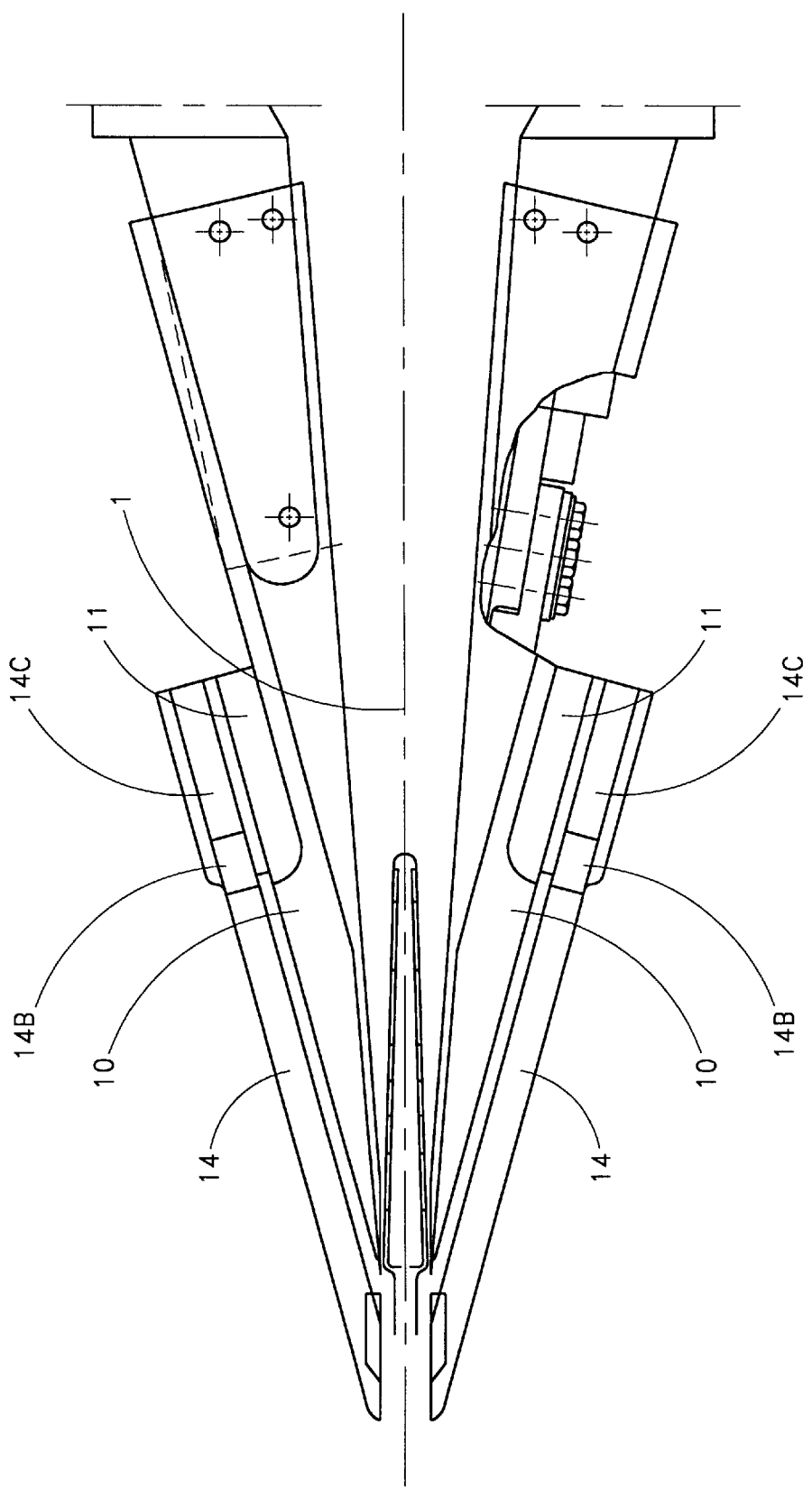
FIG. 6 shows the plan view of a scraper blade with a cutting support element, wherein the cutting edges of the scraper blades are such that the fillet may be divided already on the skin.

The tip of the lower blade 11 upstream from the juncture of cutting edge 13 thus forms a plate about ⅛ inch thick having a curved lower edge and a straight upper edge. The upper blade 10 has a wedge shape generally constructed like a mirror image of blade 11, except that the length of the cutting edge is shorter—as indicated in FIGS. 4 and 6. The upper scraper blade 10 has a more pointed end to allow the end to enter the cut formed by the sickle knife.

The scraper blades 10, 11 extend laterally at a diagonal angle from the adjacent and generally vertical planes in which guide elements 2 and 3 are located. The blades 10, 11 are thus angled relative to the conveyance path so the cutting edge 13 of the blades 10, 11 is at an angle of about 16–22°, and preferably at an angle of about 18°, relative to a vertical plane through the conveyance path. Due to this divergence of the cutting edges 13 of the scraper blades 10 and 11 with respect to the guide elements 2 and 3 and the conveyance path of the fish, the scraping off of those fish parts which are located on both sides of the ribs 19 takes place.

The cutting support elements 14 are generally parallel to, and adjacent to the cutting edges 13, as shown in FIGS. 3 and 6. A tension rod 202 (FIG. 3) is also generally parallel to, and adjacent the extended length of the lower cutting blade 11. The cutting support elements 14 contact the fish, and urge the underside of the ribs 19 into a straightened, laterally extending position into alignment with the blades 13 as shown in FIG. 2.

Figure 8:
FIG. 8 shows two independent fillet parts of one fish half where the skin has been removed.

The cutting edges 13 are extended in the direction of advance toward the rear and toward the outside, so that they separate the flesh from the ribs as in the prior art. But the extended portion of cutting edge 13 of the lower blade 11 divides the fish half 27 (FIG. 8) into two parts 23 and 24 without separating the skin 25, as shown in FIG. 8. One part of the fillet 27 forms the shank portion 23, while the belly flap or nugget 24 forms the other part. The extended portion of the lower blade 13 cuts through the flesh up to the skin 25, but advantageously does not completely sever the skin. By connecting the two pieces by the skin 25 to form a single piece, the later processing is made easier. The ultimate result is a fillet with two separate pieces 23, 24 held together by the skin 25, as shown in FIG. 8.

Figure 7:
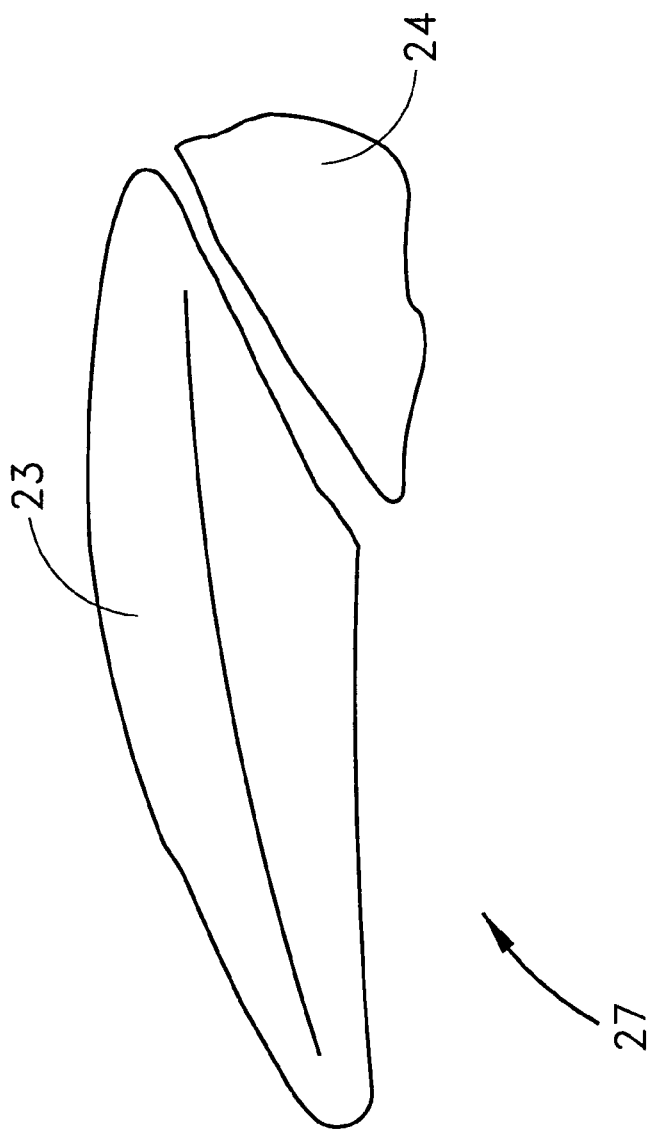
FIG. 7 shows a fish half with two independent fillet parts which are connected by the skin.

Referring to FIG. 7, after the skin 25 is removed two independent fillet parts 23 and 24 are produced: a shank portion and a nugget. Advantageously, the edge 13 of lower scraping blade 11 is positioned to increase the size of the more valuable shank 23 at the expense of the nugget 24.

Because of the extended cutting by the lower blade 11, it may be necessary to more securely hold the fillet during cutting. Spring loaded plates or members resiliently urged against the fish can be added as needed, depending in part on the speed of the conveyor and size of the fish.

Cutting Support

Opposite the two cutting edges 13 of each scraping tool 9, respectively, is a cutting support 14 with a bulge-like cross-section, spaced slightly from the cutting edges 13. Each cutting support 14 is arranged parallel to the sectional planes of the belly knives 4 and of the back knives 5 and, at the end which faces upstream against the direction of advance of the fish, and has an outwardly and downwardly pointed tip 15 as best seen in FIGS. 2 and 4. Each cutting support 14 is positioned in use such that the tip 15 is below the horizontal plane of the guide path 1 to engage a belly flap and cause it to slide over the support 14. The cutting supports 14 are thus arranged to parallel the cutting edges 13. They are orientated to have an upstream end adjacent the conveyance path and a downstream end away from the conveyance path so the side 27 of the fish travels over the generally horizontal cutting support 14. Such cutting supports are used in the prior art. But the cutting support of this invention has an extended length and a slightly differently shaped transition area from the thicker to the thinner part. The cutting support element 14 has an upstream end facing upstream, against the direction of advance of the fish 17 and has a downwardly pointed tip 15 to help urge the belly flap onto the support 14.

Referring to FIG. 2, element 14 has a bulge-like cross-section with a flat side toward the vertical plane through the conveyance path 1. The side away from the vertical plane is curved, and it has a flat bottom, to form a quarter-round cross sectional shape. The element 14 is oriented in a diagonal or diverging manner relative to the plane of guide elements 2, at approximately the same angle as the cutting edges. The element 14 is spaced apart from the adjacent cutting edge 13. The upstream end of each element 14 is generally aligned with the generally vertical planes containing belly fillet blades 4 and the back fillet blades 5.

As seen in FIGS. 4 and 6, the cutting support 14 has a transition area 14b where the upper surface of the support 14 reduces its height and forms a generally flat, horizontal surface 14c. The length of the horizontal surface 14c is extended from what was previously used, and the shape of the transition area 14b is made to generally conform to the shape of the portion of tension rod 202 that is located by the transition area 14b. The belly flap of the fish slides over the support 14, and is resiliently gripped between the transition 14b and flat portion 14c and the tensioning rod 202 so the belly flap is pulled with a force of about 5–10 pounds, and preferably about 7.5 pounds.

Tension Rod Adjustment

As illustrated in FIG. 1, the tension rod 202 may be cantilevered from a support located adjacent the conveyance path 1, such as bone guide 2 or the support to which the bone guide 2 is mounted. Advantageously, however, the tensioning rod 202 is mounted to a multi-position support 160 that allows positioning of the rod 202 in multiple degrees of freedom.

Figure 10A:
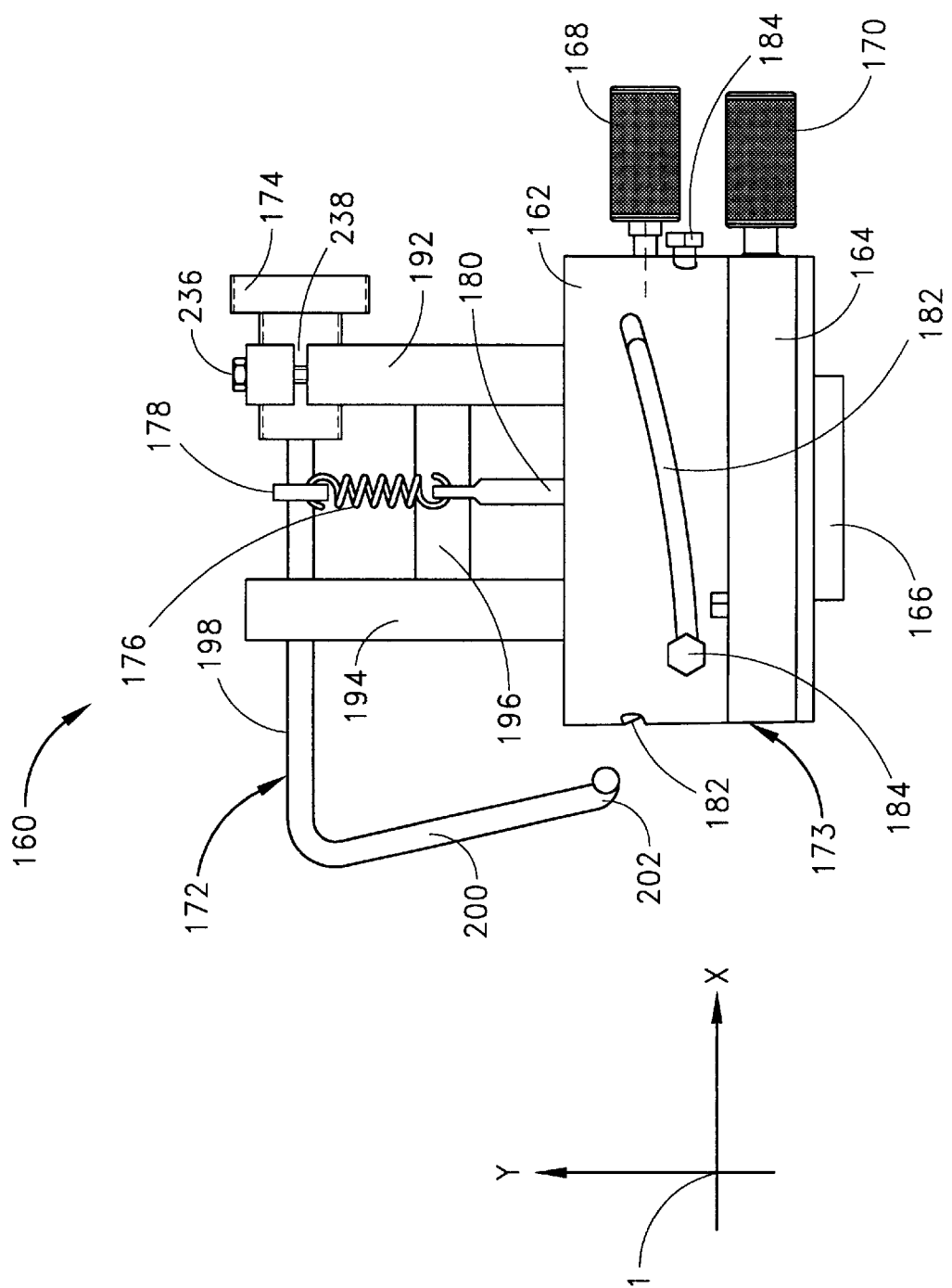
FIG. 10A is a side elevation view illustrating one side of a tool constructed in accordance with one preferred embodiment of the present invention.
Figure 10B:
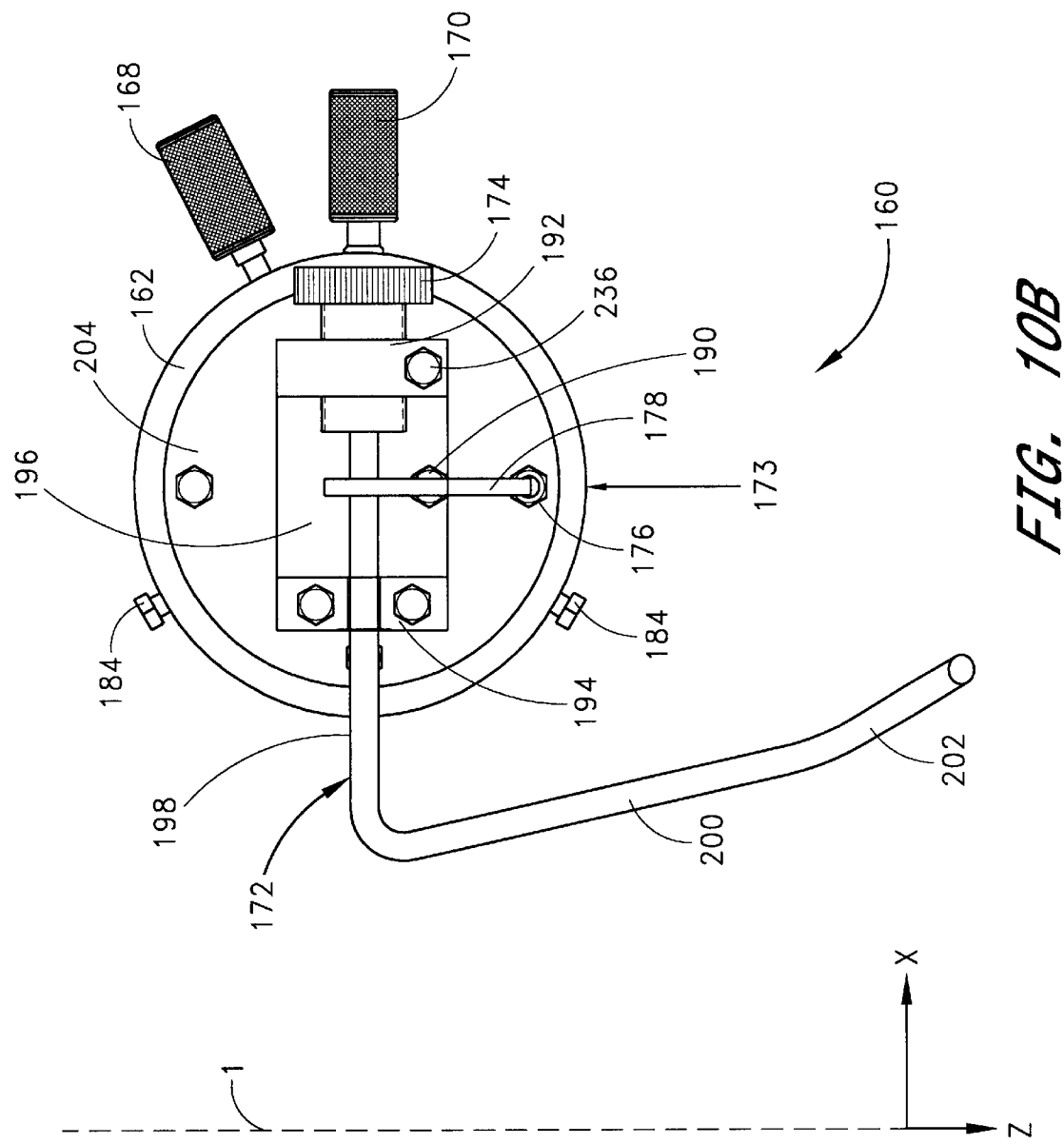
FIG. 10B is a top plan view of the tool of FIG. 10A.
Figure 10C:
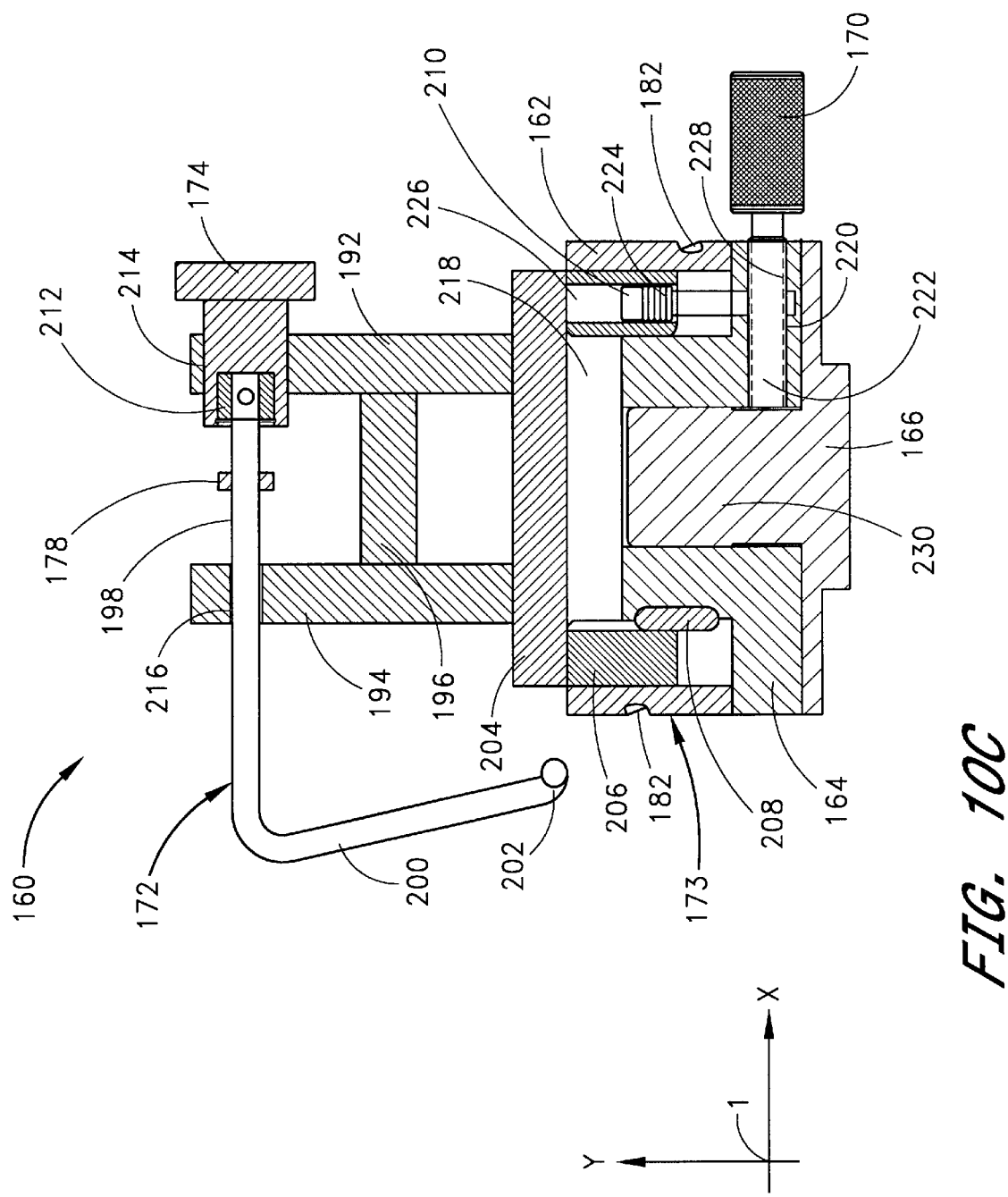
FIG. 10C is a partially cross-sectional view of the tool of FIG. 10A illustrating the tension rod in the raised position.
Figure 10D:
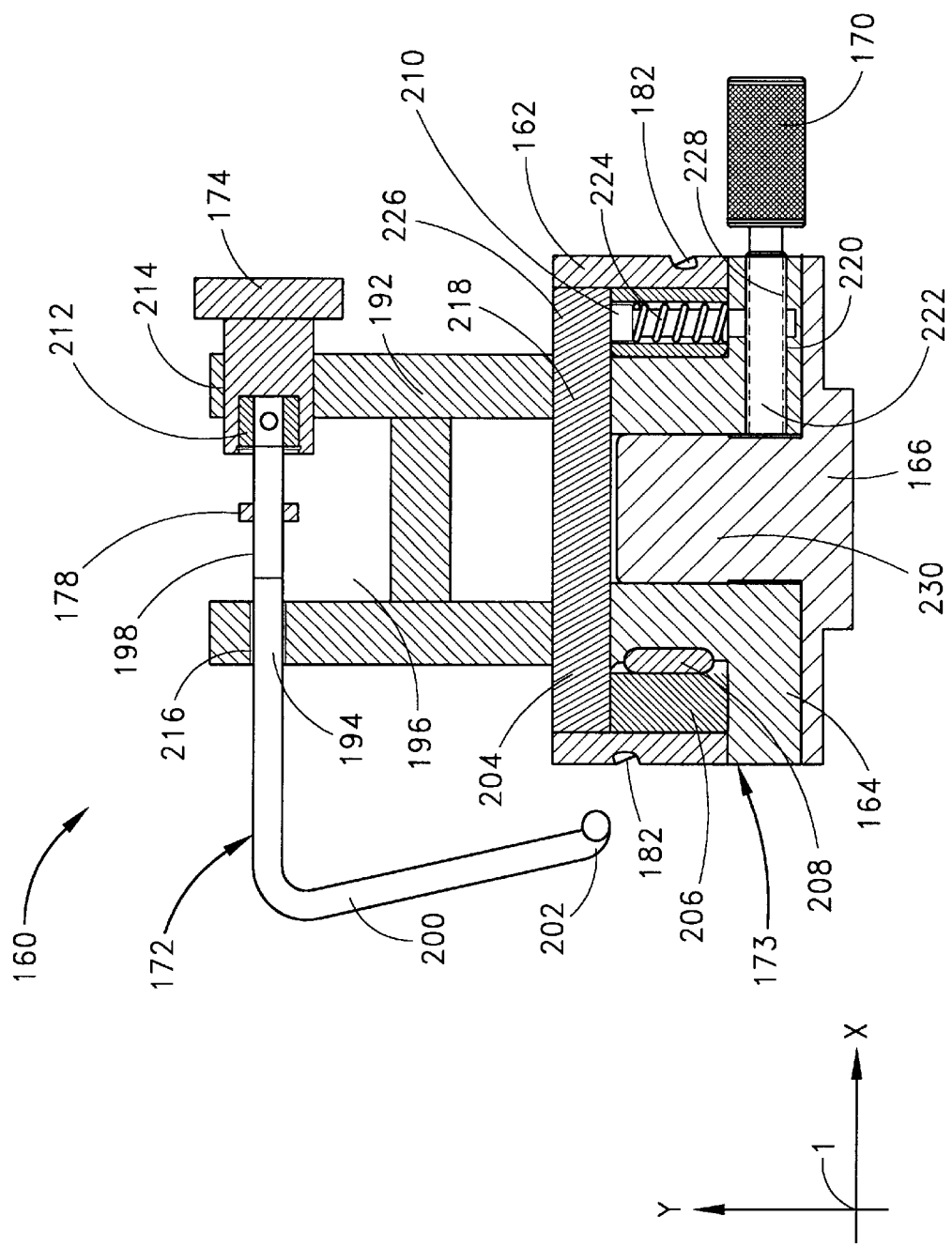
FIG. 10D is a partially cross-sectional view of the tool of FIG. 10A illustrating the tension rod in the lowered position.
Figure 10E:
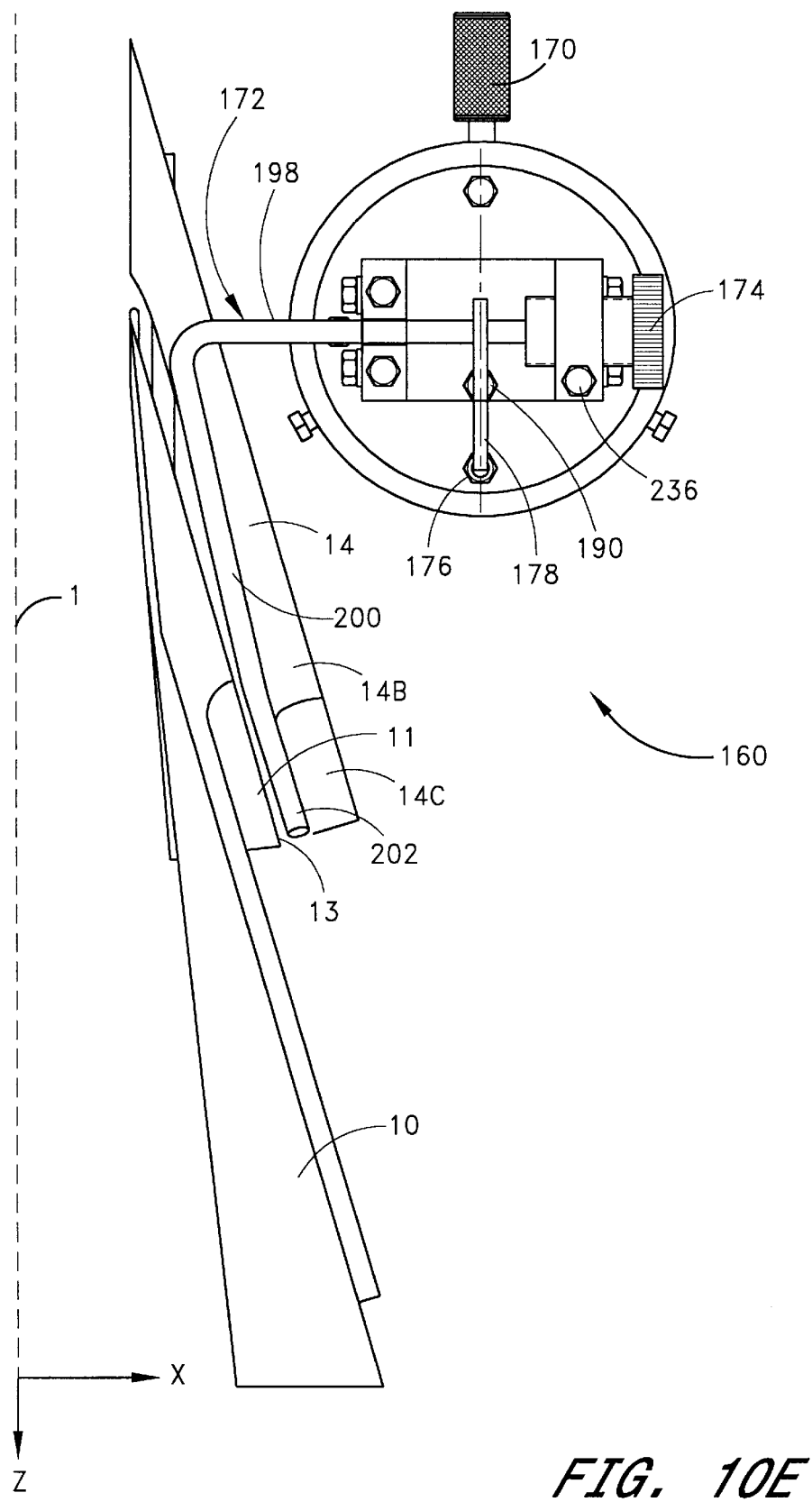
FIG. 10E is a top plan view of the tool of FIG. 10A illustrating the tool and scraper knives arrangement.

As illustrated particularly in FIGS. 10A to 10E, one preferred embodiment of the present invention further incorporates a multi-position adjustment tool 160 for tension rod 202, so the rod 16 is advantageously adjustable about three axis of translation and two axis of rotation to resiliently urge the nuggets in to position relative to knives 11 and cutting support 14 to separate the nugget flesh from the skin of the fish. As best seen in FIG. 10E, the tool 160 has a spring-loaded tension rod 202 that resiliently urges the nugget section of the fish against the surface of cutting support 14 so the cutting edges 13 of scraper knives 11 cut the belly flap up to, but not through the skin.

The rotation and timing mechanisms are known to those skilled in the art and are not described in detail herein. Briefly, however, the downstream ends of blades 10, 11 are connected to a rod that rotates about an axis orthogonal to a vertical plane along conveyance path 1. The rotation is caused by a motor, cam, solenoid or other mechanism. A physical contact sensor can abut the fish to coordinate the rotation timing, or an optical emitter and detector can be used with the fish interrupting a beam between the emitter and detector in order to detect the fish position.

Since the catfish belly has been slit down the middle, there are a pair of nuggets or belly flaps. The tool 160 is approximately symmetrical with respect to the conveyance path 1 of the fish 17. Thus, for the sake of brevity, only one side of the tool 160 is illustrated in FIGS. 10A to 10E. Those skilled in the art will be aware that the opposing is similar in construction and operation.

In use, a fish that has been beheaded, gutted and slit along its underside is conveyed tail-first towards the tool 160. The belly flaps constitute the meat of the fish which is on the underside of the fish and between the ribs and the skin of the fish. Since the underside of the fish has been slit, each belly flap having a pelvic fin is disposed on one side of the fish conveyance path 1.

Depending on the location of the support for the rod 172, the rod may take various shapes in order to have a tension portion 202 at the proper location during cutting. In the illustrated embodiment, the tension rod 202 has a complex shape and is generally denoted as rod 172, with tension support 202 being the portion adjacent the cutting edges 13. The rod 172 has an upper section 198, a medial or middle section 200 and a lower, tension section 202 (see FIGS. 10A to 10E). The tension rod upper section 198 is attached to a support that allows multi-axis positioning. Advantageously, the rod 172 is fastened to the tool base assembly 173, which in turn is located above, and to one side of, conveyance path 1.

Referring to FIGS. 10D and E, the upper section 198 of tension rod 172 extends in a generally horizontal plane toward the conveyance path 1. The middle section 200 extends downward and away from the conveyance path 1 at less than about 90° with respect to the upper section 198 a distance sufficient to place the tension rod lower section 202 adjacent, but slightly above, the plane containing the cutting edge 13 of lower scraper knife 11. The lower scraper knife 11 is slightly below upper knife 10, and spaced apart a distance sufficient to allow the ribs of the fish to pass between the knives 10, 11 so the cutting edges 13 sever the flesh on opposing sides of the ribs, as seen in FIG. 3. The knives 10, 11 are advantageously in a generally horizontal plane, with a cutting edge on the side of the knife away from conveyance path 1. The knives 10, 11 thus have a generally triangular shape, with the point headed upstream to engage the fish 17, and with the cutting edge 13 having a downstream end further from the conveyance path 1 than the upstream end. The lower section 202 of the tension rod is bent to lie in a generally horizontal plane and to generally align with the angle of the cutting edges 13 as best seen in FIG. 10E.

The elongated, cutting support 14 is directly opposite the cutting edges 13 for a portion of its length, but after the transition 14b, lies below the lower cutting blade 10. As reflected in FIG. 1, the tension rod 202 is above and generally aligned with the inside edge of the cutting support 14c. It may be advantageous to have the tension rod 202 over the support 14c. The distal end 202 of the tension rod 172 overlaps, and would hit the corresponding portion of support 14 except that the support 14 has a reduced vertical height in the area where tension rod 202 is located, with the upper surface of the support 14c forming a generally flat, horizontal surface with the tensioning rod 202 being adjacent and generally parallel to that flat surface. This reduced height dimension begins at the transition area 14b, which is slightly upstream of the bend that transitions from the middle section 200 to the distal end section 202 of rod 172. The transition area 14b forms a generally inclined area leveling off to the horizontal portion 14c.

The nugget or belly portion of the fish passes between the horizontal portion 14c and the tensioning rod 172. The spacing between the distal end 202 of tension rod 172 and the end 14c of support 14 is selected to provide the desired force and tension of the nugget and skin that is located between the end 202 and support 14c. The tension can be adjusted for ranges of fish sizes, with a larger gap being required to accommodate the thicker belly flaps of larger fish.

The location of the bend where the tensioning rod 202 assumes a position generally parallel to the horizontal portion of support 14c can affect the accuracy and completeness of the resulting cut. To achieve optimum performance the tool 160 should be adjusted in the field to achieve suitable performance characteristics according to the particular fish size, saddle speed, and other operational characteristics. Advantageously, the bend conforms to the shape of the transition area 14b.

Adjusting the position of the distal end 202 of the tension rod 172 is important to proper cutting of the nuggets. As mentioned above, the base assembly 173 of the tool (shown in FIGS. 10A to 10E) provides means for adjusting the tension rod 172 in the optimum position. Preferably, the base assembly 173 controls the adjustment of the tension rod 172 in two axial degrees of freedom and two angular degrees of freedom.

Referring primarily to FIGS. 10C and D, but also to FIGS. 10A and E, the base assembly 173 allows vertical positioning along the Y axis and rotational positioning about the Y axis. As used here, the Z axis is along the direction of travel along the conveyor path 1, and Y is the upward, vertical direction. The base assembly includes a base support 166 that is fastened to a support structure. The base support advantageously comprises a central, cylindrical post 230 and an outwardly extending flange at the bottom end of the post. A rotary base 164 encircles the post 230 and is mounted to rotate about support 166, about the Z axis. Advantageously the rotary base 164 comprises an outwardly extending flange adjacent the flange of the base 166, with a central, cylindrical boss surrounding the central post 230 of the base 166. A base lock 170 is located to lock the base 164 from rotating relative to support 166.

A cam ring 162 is attached to the rotary base 164 and has a cam ring lock 168 to stop rotation of the cam ring 162 relative to the base support 166. Advantageously the cam ring 162 comprises a cylindrical tube located at the periphery of the flange on the rotary base 164. A vertical slider 206 is slidably located between the rotary base 164 and the cam ring 162. A disk 204 is seated on the vertical slider 206. Advantageously the slider 206 comprises a cylindrical tube that fits inside the cam ring 162, with the disk 204 forming a top on the slider 206. The disk 204 and the vertical slider 206 are substantially vertically displacable in a cavity 218 formed generally between the rotary base 164, the cam ring 162 and the disk 204. Rotation of the cam ring causes the disk 204 and slider 206 to move vertically along the Y axis, as described later.

A pair of vertical support plates 192, 194 extend upward from the top of disc 204. The plates 192 support the tension rod 172, and are spaced apart by a horizontal support plate 196. Referring to FIGS. 10A and E, a securing bar 178 is secured to the tension rod upper end 198. A first end of spring 176 is connected to bar 178 which has its bottom end attached to a spring tension adjuster 180 fastened to disc 204. A horizontal position control knob 174 is disposed in the vertical support plate 192 to allow movement of the tension rod 172 along the X axis, as described later. An angular adjuster 190 is attached to the horizontal plate 196 and substantially aligned below the securing bar 178, to allow rotation of the tension rod 172 about the X axis, as discussed later.

Referring to FIGS. 10A to 10E, the base support 166 is used to fixedly secure the tool 160, preferably to the filleting machine, such as on a platform or the like. The base support 166 may be secured to the filleting machine using, for example, screws or it may be welded into place or other fastening means may be used, as needed or desired. Preferably, the base support 166 includes a substantially cylindrical central core 230 which is surrounded by the rotary base 164.

Preferably, the rotary base 164 of the tool 160 (FIGS. 10A to 10E) is rotatable about the longitudinal axis of symmetry of the base support core 230, which here corresponds to the Y axis. Rotation of the base 164 relative to the support 166 is used to rotationally adjust the position of the tension rod 172 about the Y axis. Thus, substantially all the components of the adjustment tool 160 above the rotary base 164, including in particular the tension rod 172, and excluding the base support 166, will be rotationally displaced along with the rotary base 164. In this manner, the rotary base 164 of the tool 160 provides means for adjustment, with respect to the scraper knives 11 of the tension rod 172 in one angular degree of freedom, thereby, advantageously, permitting flexibility in positioning of the tension rod 172, as required or desired.

The rotary base 164, preferably includes a threaded opening 220 that is engaged by the threaded portion 228 of the rotary base lock 170. By threading (or tightening) the rotary base lock 170, an end 222 of the rotary base lock threaded portion 228 is securely engaged with the base support post 230, thereby locking the rotary base 164 in a fixed position and preventing it from being rotated. By unthreading (or loosening) the rotary base lock 170, the end 222 of the rotary base lock threaded portion 228 disengages from the base support core 230, thereby unlocking the rotary base 164. In this unlocked state the rotary base 170 can be rotated, by using the rotary base lock 170 as a handle, with respect to the longitudinal axis of symmetry of the base support core 230.

Referring to FIGS. 10A to 10E, the cam ring 162 is used to adjust the vertical position of the tension rod 172 along the Y axis by controlling the vertical displacement of the vertical slider 206 and the disk 204 within the cavity 218. The cam ring 162 includes a plurality of mating, cammed surfaces. Here the cammed surfaces take the form of helical slots 182, and preferably, three helical slots 182. Each helical slot 182 is traversed by a follower bolt 184 which is connected to the vertical slider 206. The slider 206 can move vertically, and rotation of the cammed slots 182 relative to the follower bolts 184 fastened to rotary base 164, causes the slider 206 and disc 204 to move vertically along the Y axis.

Preferably, a feather key 208 is disposed between the vertical slider 206 and the rotary base 164, as is illustrated in FIGS. 10C and 10D. The cam ring lock 168 is used to lock the cam ring 162 in a fixed position, and can lockingly engage the vertical slider 206 in a manner akin to the engagement of the rotary base lock 170 and the rotary base central core 230. Referring to FIG. 9D, advantageously, the vertical slider 206 includes a cavity 226 which houses a spring 224 resiliently urging an over-travel stop 210 into a locking aperture to prevent over-extension of the slider ring and parts attached thereto.

FIG. 10C shows the adjustment tool 160 with the tension rod 172 in the fully raised position representing the maximum vertical elevation along the Y axis. FIG. 10D shows the adjustment tool 160 with the tension rod 172 in the fully lowered position representing the lowest vertical position. To adjust the vertical position of the tension rod 172 the cam ring lock 168 is loosened which releases the lock on the vertical slider 206 and permits the cam ring 162 to be rotated. The rotation of the cam ring 162, preferably using the cam ring lock 168 as a handle, allows the helical slot bolts 184, which are attached to the vertical slider 206, to travel along the respective helical slots 182 while the feather key 208, whose function and operation are well known in the art, prevents rotation of the vertical slider 206 and allows it to be displaced in a vertical direction within the cavity 218, thereby permitting the tension rod 172 to be vertically displaced. The spring 224 which is attached to the vertical slider 206 moves with the slider 206, and provides a downward stabilizing force on the slider 206. Thus, the cam ring 162 of the tool 160 provides means for adjustment, with respect to the scraper knives 11 (shown in FIG. 10E), of the tension rod 172 in a vertically axial degree of freedom, thereby, advantageously, permitting flexibility in positioning of the tension rod 172, as required or desired.

Referring to FIGS. 10A to 10E, the control knob 174 is used to adjust the horizontal position of the tension rod 172 by being axially displacable in a hole 214 in the support plate 192. Preferably, the tension rod upper section 198 is rotatably coupled to a bushing 212 disposed in the control knob 174, as can be seen in FIGS. 10C and 10D. Also, the tension rod upper section 198 passes through a hole 216 in the support plate 194 and is displacable and rotatable within the hole 216 of the support plate 194. Preferably, the control knob 174 is clamped in the hole 214 via a bolt 236 (shown in FIGS. 10B and 10E) that traverses a gap 238 (shown in FIG. 10A) which is adjacent to the hole 216.

To adjust the horizontal positioning of the tension rod 172 along the X axis, toward and away from the conveyance path 1, the bolt 236 (shown in FIG. 10B) is loosened and the control knob 174 is axially displaced which horizontally displaces the tension rod 172 since it is displacable through the hole 216 in the support plate 194. After the tension rod 172 is positioned, as required or desired, the bolt 236 (shown in FIG. 10B) is tightened to clamp the control knob 174 in place, thereby securing the tension rod 172 as well. In this manner, the control knob 174 of the tool 160 provides means for adjustment, with respect to the scraper knives 11 (shown in FIG. 10E), of the tension rod 172 in a horizontally axial degree of freedom, thereby, advantageously, permitting flexibility in positioning of the tension rod 172, as required or desired.

Preferably, the angular adjuster 190 (shown in FIG. 10E) is used to rotationally displace the tension rod upper section 198 about the substantially longitudinal axis of the control knob 174, which corresponds here with the X axis. The tension rod upper section 198 is rotatably disposed in the control knob bushing 212 and in the hole 216 of the support plate 194, as best illustrated in FIGS. 10C and 10D. Preferably, the tension rod upper section 198 is non-movably attached to the securing bar 178 which extends perpendicular to the length of the upper section 198. An angular adjuster 190 (shown in FIG. 10B), comprising a bolt 190, is disposed substantially below the securing bar 178. One end of the bolt 190 screws into a hole (not shown) in the support plate 196, with the other end abutting securing bar 178. The bolt 190 may be merely secured into the plate 196, or it may be locked into position by using, for example, a pair of nuts (not shown) to form a friction lock relative to support plate 196. By adjusting the length of the bolt 190 the bolt 190 can be used to push generally upwards against the securing bar 178. This results in the tension rod upper section 198 being longitudinally rotated with respect to the substantially longitudinal axis of the control knob 174. In this manner, the angular adjuster 190 of the tool 160 provides means for adjustment, with respect to the tension rod end 202 and scraper knives 10, 11 (shown in FIG. 10E), of the tension rod 172 in one angular degree of freedom about the X axis, thereby, advantageously, permitting flexibility in positioning of the tension rod 172, as required or desired.

Referring to FIGS. 10A to 10E, preferably the spring tension adjuster 180, shown best in FIG. 10A, is generally rod-shaped, with one end coupled to the bottom end of the spring 176 and to the disk 204. Preferably, the vertical positioning of the spring tension adjuster 180, relative to the disk 204, can be adjusted, thereby increasing or decreasing the tension in the spring 176, and thus the spring-loading on the tension rod 172, as required or desired. A threaded adjuster 180 that screws into or out of the disk 204 can be used.

Preferably, and referring to FIGS. 10A to 10E, the tension rod 172, the base support 166, the cam ring 162 and the securing bar 178 are fabricated from a durable and corrosion resistant material such as stainless steel, though other suitable metals, alloys, plastics and ceramics may be used with efficacy. Preferably, the spring 176 may be fabricated from a wide variety of materials including high carbon steel, stainless steel and various alloys such as nickel-based alloys and copper-based alloys. Alternatively, other suitable resilient means may be substituted for the spring 176. Preferably, the rotary base 164, the control knob 174, and the support plates 192, 194, 196 are fabricated from a durable, high strength, light weight, chemically resistant plastic such as Delrin, though other suitable plastics, metals, alloys and ceramics may be used with efficacy.

In use, and referring to FIGS. 10A to 10E, the tool 160 is used to position the tension rod 172 to the optimum position for distal end 202, as largely dictated by the particular requirements of the filleting operation. The scraper blades 10, 11 then assist in the scraping of the nuggets or belly flaps of the catfish. Preferably, the adjustment tool 160 and blades 10, 11 are mounted downstream of the pelvic fin cutter 50 (shown in FIGS. 9A, 9B and 9C) and in conjunction with the station that separates the nugget (belly flap) of the fish from the rib bones using the scraper knives 10, 11. Preferably, and referring in particular to FIG. 10E, the tension rod lower portion 202 is positioned adjacent to the extended end of cutting edges 13 of lower scraper knives 11, so that as the nugget passes past the extended cutting edges 13, it is forced between the lower portion 202 of the spring-loaded tension rod 172 and the support 14c and the cutting edge 13. Advantageously, this permits the nugget to be stretched and facilitates the cutting process utilizing the scraper knives 10, 11. Additionally and desirably, the tensioning on the spring-loaded tension rod 172 helps control the depth of the cut while the base assembly 173 permits optimum positioning of the tension rod 172 relative to the fish, thereby ensuring that the nugget skin is not cut but the nugget flesh is cut by the lower scraper knife 11.

Skin Removal

The conveyor carries the fillets to a skin removal device which includes a skin removal cylinder 32 placed close to a skin removing blade 33 which faces at a small distance the outer surface of the cylinder 32. Longitudinal grooves pressed on to the roller outer surface 34 grip the skin and carry it between the gap between the cylinder 32 and blade 33. A conveyor device with a continuous conveyor belt 35 is deflected via a guide wedge 36 into the reverse strand directly before the outer surface of the skin-removal cylinder 32. The skin-removal cylinder 32 and the conveyor belt 35 are driven in the same direction. The conveyor belt 35 moves the skin of the fish 17 into contact with the cylinder 32, which grips the skin and moves the fish 17 to knife 33 which separates the skin from the flesh. The skin of the fish half 27, shown in FIG. 8, is now removed in the area of the skin-removal device. The result of the skin removal can be seen in FIG. 7, which shows two separate, skinned pieces: shank 23 and nugget 24.

Operation

The operation of the device is as follows: A fish 17, which is at least opened in the area of its abdominal cavity and which has preferably been gutted, decapitated, with its tail fin removed, is placed with its abdominal cavity 18 onto a tractive force saddle 8 by means of the tractive force conveyor in such a way, that its tail points into the direction of advance of the conveyor. Following the alignment with the aid of dorsal fish guide 21, the dorsal fin 30 is erected and the dorsal spike 31 detected by a sensor 22 to locate the position of the dorsal spike and fish 17 relative to the saddle 8 on which the fish rests. This provides the timing for some later mechanisms such as the dorsal fin cutters, or other mechanisms operated by computer 41.

The signal from the dorsal fin detector 22 rotates the dorsal cutting blades 317 into position to cut just below the dorsal bone, while the dorsal fish guides 2a position the dorsal cutting blades so they cut at the appropriate location on the fish regardless of the size of the fish. The fish 17 can be moving at speeds of 600 mm/sec or more, so the dorsal cutters 317 can have a travel time of about 19 ms or less for each fish, resulting in very fast movement.

The fish 17 is next directed toward the belly knives 4 and the back knives 5. These produce two cuts each, extending on both sides of the belly spines and back spines but not extending through the ribs or skeleton. The back knives 5 are controlled via a cam mechanism off a main drive shaft of the machine, as are the majority of other components except for the dorsal fin cutters 317. As the fish leaves the back knives and the belly knives the cut is such that in the area of the tail complete release of the fillets from the fish skeleton takes place, but in the area of the abdominal cavity the cut extends above the ribs 19. A pivot motor rotating the back knives 5 could also be used to position the knives. As the fish leaves the back knives 5 and belly knives 4 the fish is held to the skeleton by a segment of flesh along the length of the backbone of the fish 17.

The pelvic fin of the fish 17 then enters the space between levers 52, 54. As the fish 17 moves along the conveyance path, the diverging levers 52, 54 pull on the pelvic fin, and pull the fin into blade 56 which cuts the fin. Continued pulling results in a cutting-tearing removal of the pelvic fin. After the fin is removed, the levers open to release the fin, and a jet of air, water or both ensures removal of the pelvic fin. During removal of the pelvic fin, spring loaded members may be needed to hold the severed portions of the fish in a secure position.

During the further advance of the fish 17, the bone guides 2 and the saddle guides 3 enter the slits cut in by the knives 4, 5 to help guide the fish, by using the strips of flesh and skeleton containing the back spines 20 and the belly spines. The sickle knife makes a short cut through the flesh parallel to the spines, and the fish passes to the scraper blades 10, 11.

At the tips of scraper blades 10, 11, the tail portion of the fish passes and when the ribs approach the upstream end of blades 10, 100 are rotated so that the top scraper knives 10 engage the slot cut by the sickle and to allow the ribs to pass between the blades with the cutting edges 13 severing the ribs from the flesh as the ribs scrape over the blades. The extended portion of lower blades 11 severs the flesh up to, but preferably not through the skin.

The area of the scraper blade 11 is lengthened in comparison with the top scraper blade to provide, in connection with the cutting support 14, a separation of the fish half 27 such that both fillet parts 23 and 24 are connected merely via the skin 25 of the fish half 27 of the fish 17. Advantageously the skin 25 connects the fillet parts 23, 24 along the entire length of the cut that separates the fish parts, but some cutting of the skin is permitted as long as the parts are connected together sufficiently to allow skinning of both parts as though they were a single piece of fish rather than two separate pieces. The cutting supports 14 and tensioning rod 202 help the cutting by the extended cutting edge 13 due to contact pressure and tension in the flesh produced. Further, the ribs 19 are straightened into a generally horizontal position as they slide over the cutting support 14 and over the cutting edges 13 to scrape off the flesh on the cutting edges 13.

At this point the flesh is held to the skeleton only by short strips of flesh at the tail of the fish. A pair of severing knives rotate into position to sever this remaining connection. The knives rotate into and out of position to avoid cutting the wider dorsal area of the skeleton. Advantageously the knives are located above the conveyance path, and rotate into and out of the path to sever the fillets. The severed fillets fall from the fish skeleton onto a conveyor.

Two fillets are produced for each fish. Each fillet advantageously has no dorsal bones and no dorsal plate, has no pelvic fin or cartilage, and has two separate pieces of flesh (shank 23 and nugget 24) held together by the skin 25. The conveyor carries the fillets to a skinner that removes the skin, to produce a shank portion and a nugget portion for each fillet. It is believed possible to produce shank portions consistently sized relative to a size of fish and larger than the prior art. It is believed possible to produce nugget portions that are also consistently sized relative to a size of fish and that are consistently smaller than in the prior art. This advantageously increases the shank to nugget ratio.

While the base assembly 173 is described as allowing adjustment of the position of the tensioning bar 172 about two rotational axis and three translational axis, various combinations of these adjustment features can be used. Advantageously, the entire adjustment tool 160 can be mounted on a plate that is movably positioned and fastened to a support in order to achieve movement along the third orthogonal, translational axis. Further, other ways of adjusting the position and rotational aspects of the tensioning bar 172 can be devised given the teachings of the present application.

Fish Saddle

One preferred embodiment of the present invention further incorporates a fish saddle comprising a top rail 112 (see FIGS. 11A and 11B) and a base 114 (see FIG. 12), such that the top rail 112 is removably attachable to the base 114. Typically, conventional fish saddles are a two piece metal weldment consisting of a sheet metal base and a top rail with teeth for engaging the fish. The fish saddle is coupled to a conveyor that transport the fish through the filleting machine.

Disadvantageously, if the teeth on conventional fish saddles become dull and/or damaged the entire two piece welded fish saddle has to be replaced, thereby undesirably adding to the cost. Additionally, should the metal teeth of such saddles impact the various knives and tools of the filleting machine there is the possibility that these knives and tools may be dulled and/or damaged which unwantedly leads to higher maintenance costs and lowers operational efficiency. Moreover, the modularity and adaptability of conventional fish saddles is limited since alternate teeth configurations can only be utilized by replacement of the entire fish saddle.

Figure 11A:
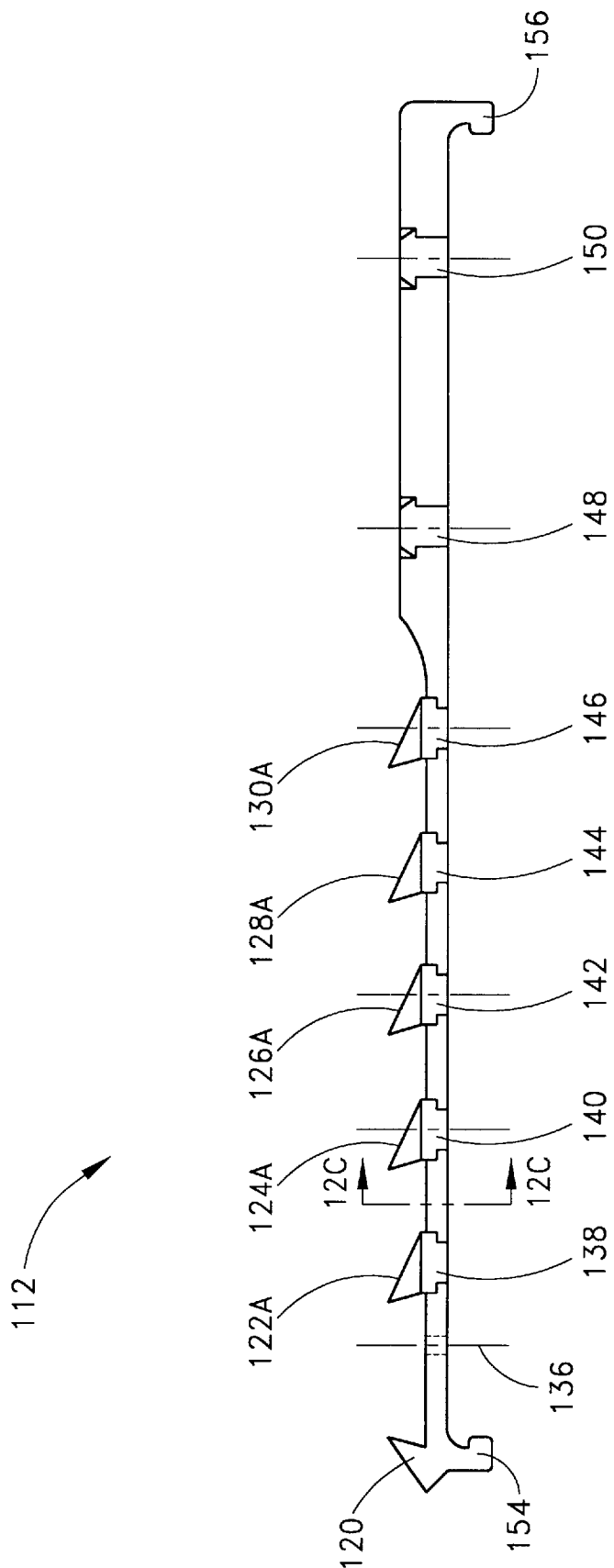
FIG. 11A is a partially sectional side view illustrating the top rail of one preferred embodiment of a fish saddle for a fish filleting machine.
Figure 11B:
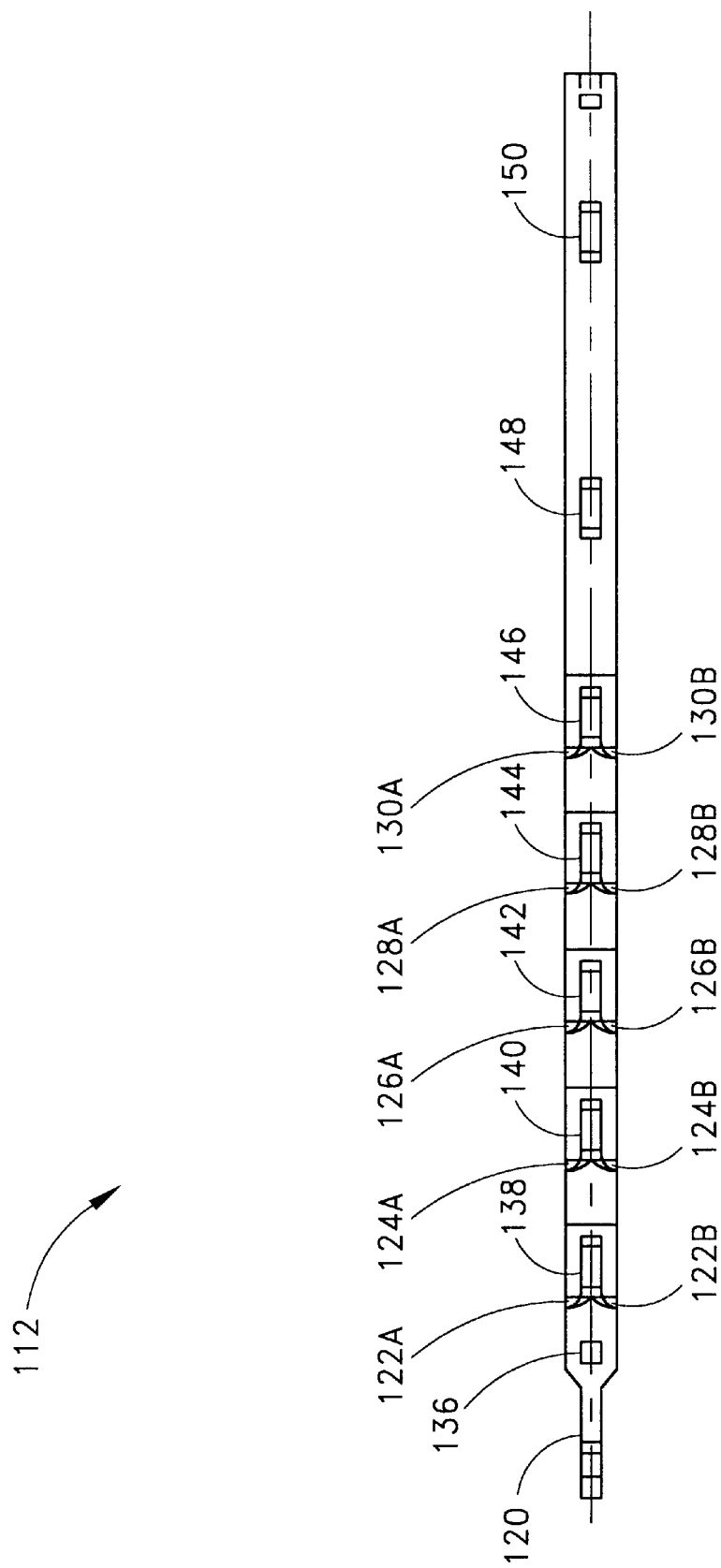
FIG. 11B is a top plan view of the top rail of FIG. 11A.
Figure 11C:
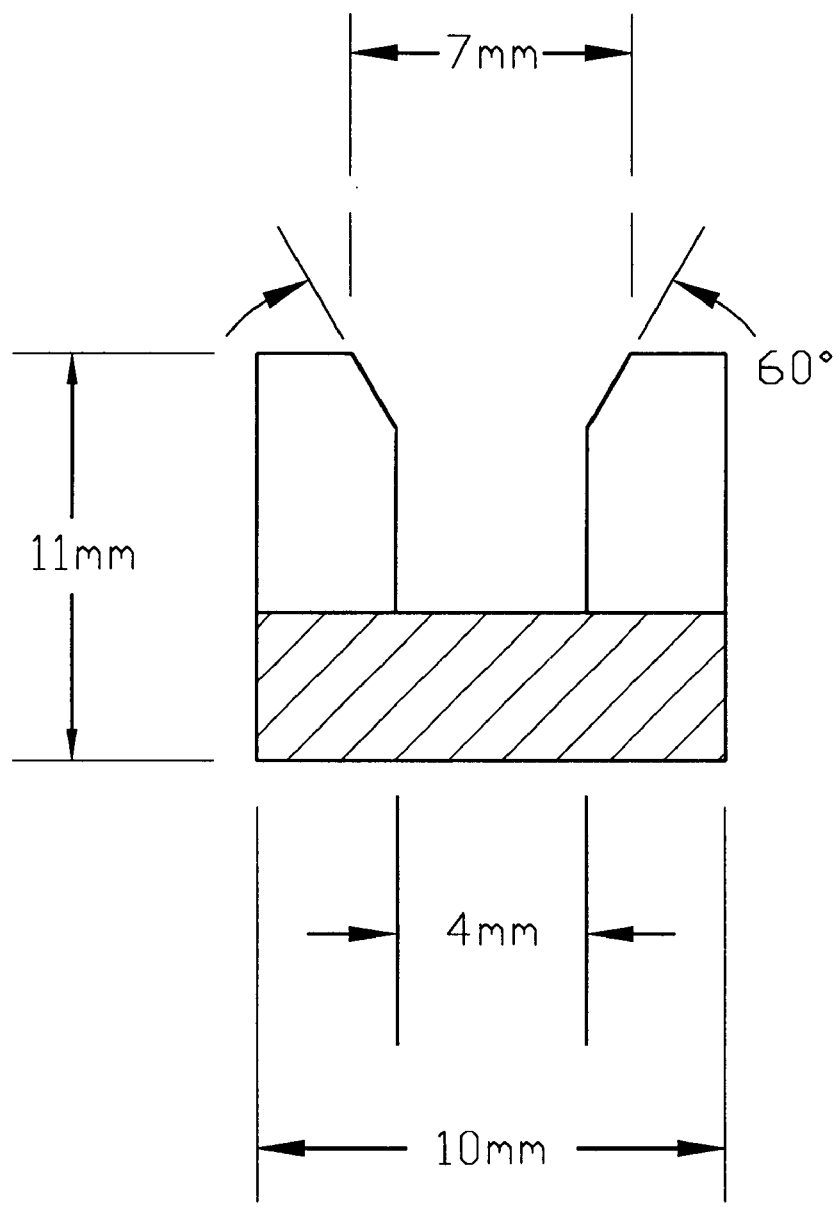
FIG. 11C is a sectional view taken along lines 11C—11C of FIG. 11B.

In one preferred embodiment of the present invention, and referring to FIGS. 11A and 11B, the fish saddle top rail 112 includes a plurality of teeth, and preferably comprises at least one upstream facing tooth 120, and five pairs of downstream facing teeth 122a, 122b, 124a, 124b, 126a, 126b, 128a, 128b, 130a, 130b, with upstream and downstream being referenced relative to the direction of conveyance of the fish along the path 1. The teeth 120, 122a, 122b, 124a, 124b, 126a, 126b, 128a, 128b, 130a, 130b are used to engage the flesh of the fish and retain the fish in a stable position while various operations are performed on it.

Preferably, the fish saddle top rail 112 also includes a plurality of pockets 136, 138, 140, 142, 144, 146, 148 and 150, generally, but not always, located below each tooth. The pocket 136 preferably has a substantially square-shaped cross-section, is located between the upstream facing tooth 122 and the tooth pair 122a, 122b, and extends through the top rail 112. The pockets 138, 140, 142, 144, 146, 148 and 150 are generally T-shaped, with the top of the "T" being aligned along the length of the rail 112 and opening onto the top surface of the rail, and the leg of the "T" opening onto the bottom surface of the rail 112. The width of the T-shaped slot is about ⅓ the width of the top rail 112. The pockets 148 and 150 have slanted ends on the top part of the "T", as can best be seen in FIG. 11A.

Further, the top rail 112 preferably has a pair of fingers 154 and 156 at opposing ends. Preferably, the finger 154 is located at the front of the rail 112 and below the tooth 120 while the finger 156 is located at the rear end of the rail 112 and faces the finger 154. The fingers extend below the rail 112 and extend slightly toward the middle of the rail 112.

Figure 12:
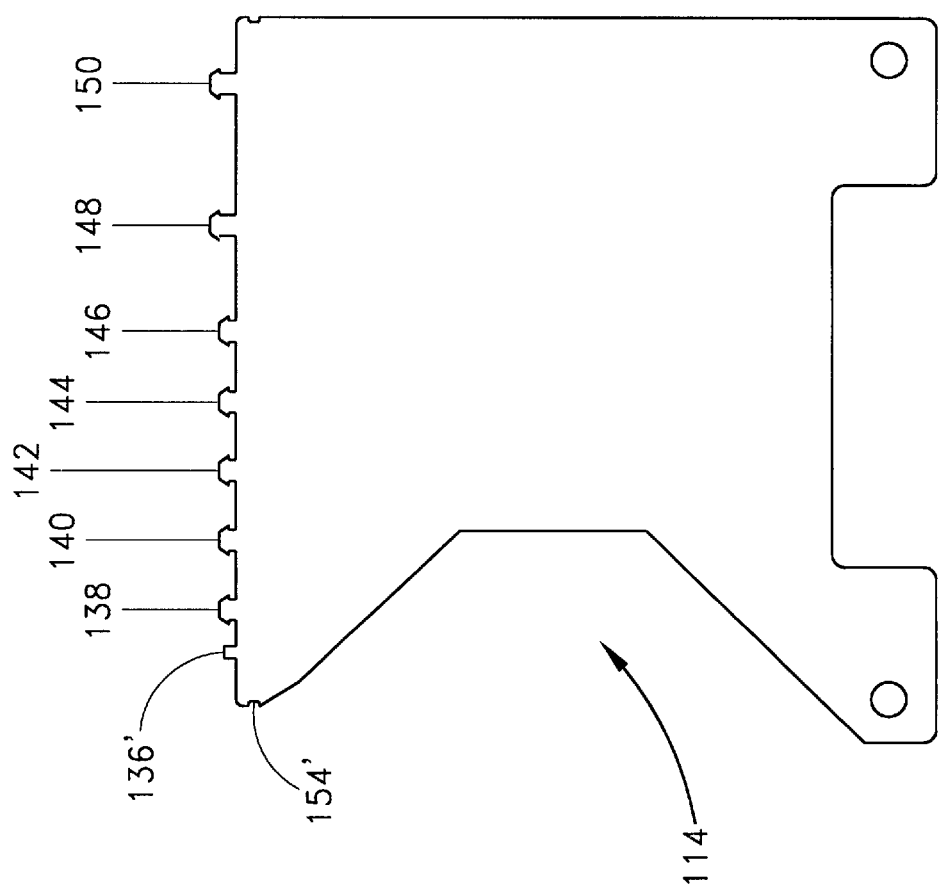
FIG. 12 is a side view illustrating the base of one preferred embodiment of a fish saddle for a fish filleting machine.

The fish saddle base 114, shown in FIG. 12, is preferably a plate-like structure and preferably includes a plurality of locking tabs 136', 138', 140', 142', 144', 146', 148' and 150' which are sized, positioned and shaped to engage and lock into the corresponding pockets 136, 138, 140, 142, 144, 146, 148 and 150, respectively, of the top rail 112 (see FIGS. 11A and 11B). The tab 136' has a substantially square-shaped cross-section while the tabs 138', 140', 142', 144', 146', 148' and 150' are generally T-shaped with slanted ends on the top part of the "T", as can be seen in FIG. 12. The base 114 further includes notches or slots 154' and 156' which engage the fingers 154 and 156, respectively, of the top rail 112 (FIGS. 11A and 11B). The fish saddle base 114 is attachable to the conveying means of the filleting machine, and when coupled with the top rail 112, can advantageously be used as the fish saddle 8 depicted in FIG. 1.

The fish saddle top rail 112 is advantageously made from a non-metallic, polymer, which is sufficiently soft relative to the cutters so that the cutters will not be damaged if they hit the top rail 112. Preferably, the fish saddle top rail 112 is fabricated from a durable, high strength, chemically resistant plastic such as Zytel 101 (Polyamide-Nylon 6/6) manufactured by Du Pont Company of Wilmington, Del. Alternatively, the top rail 112 may be fabricated from Delrin 500P (Acetal) also manufactured by Du Pont Company of Wilmington, Del. or from other suitable plastics and the like. Preferably, the fish saddle base 114 is fabricated from a sheet metal such as stainless steel, corrosion resistant aluminum and the like.

Advantageously, the use of a plastic material for the top rail 112 (FIGS. 11A and 11B) and the slanted ends of the top part of the "T" of the generally T-shaped base locking tabs 138', 140', 142', 144', 146', 148' and 150', as can be seen in FIG. 12, facilitate the coupling of the top rail 112 to the more rigid, metal base 114. Additionally, the base slots 154' and 156', which are engaged by the top rail fingers 154 and 156, respectively, facilitate removal of the fish saddle top rail 112 from the fish saddle base 114, as required or desired, for example, by utilizing a screw driver or other tools.

The fish saddle top rail 112 (FIGS. 11A and 11B) and the fish saddle base 114 are about 260 mm in length. The gripping portion of each of the teeth 122, 124, 126 128, 130 etc is about 7 mm high, about 10 mm wide and about 10–15 mm long. Other sizes and shapes of teeth 120 are believed suitable. Preferably, the spacing between the pockets 138, 140, 142, 144 and 146 is about 25 mm and the spacing between the pockets 148 and 150 is about 50 mm. The downstream end of the pocket 136 is preferably spaced by about 10 mm from the tips of the teeth 122a, 122b, and the downstream end of the pocket 148 is preferably spaced by about 40 mm from the tips of the teeth 130a, 130b. The locking tabs 136', 138', 140', 142', 144', 146', 148' and 150' of the fish saddle base 114 are correspondingly spaced so that they can lock into the pockets of the fish saddle top rail 112. Of course, those skilled in the art will recognize that these and other dimensions presented herein are illustrative of one preferred embodiment, and that the present invention may be alternatively dimensioned with efficacy, as required or desired.

The fish saddle of the present invention provides several benefits. Advantageously, if any or all of the teeth of the top rail 112 (FIGS. 11A and 11B) become dull or damaged, the top rail 112 can easily be removed from the base 114 (FIG. 12) and conveniently replaced by another top rail. This saves on cost and time compared to replacing the entire two-piece welded conventional fish saddle. Additionally, any impact of the teeth of the softer, plastic top rail 112 with the tools or knives of the filleting machine will minimize damage to the tools or knives, since the top rail 112 is preferably fabricated from a plastic material. This desirably lowers maintenance costs and enhances operational efficiency and yield. Moreover, the fish saddle top rail 112 can conveniently be replaced by an alternatively dimensioned and/or configured top rail, as needed or desired. This modularity and adaptability of the fish saddle of the present invention adds to the versatility of the fillet machine.

While the catfish fillet machine of the present invention has been described with a certain degree of particularity, it is manifest that many changes may be made in the specific designs, constructions and methodology hereinabove described without departing from the spirit and scope of this disclosure. It is understood that the invention is not limited to the embodiments set forth herein for purposes of exemplification, but is to be defined only by a fair reading of the appended claims, including the full range of equivalency to which each element thereof is entitled.

What is claimed is:

1. A device for use in filleting fish that have been decapitated, slit down the middle of the belly and eviscerated, the fish having a back spine and having ribs forming belly nuggets on opposing sides of the slit, the device having a sickle knife to place a slit in a filet before the ribs begin, comprising:

a conveyor having a gripping element configured to engage and convey fish along a conveyance path, tail first;

a pair of cutting blades positioned to cut the fish just below the dorsal plate, the blades movable between an engaged position in which the blade is proximal to the back spine of the fish when the device is in use, and a disengaged position in which the blade does not contact the fish when the device is in use;

a pair of back knives and a pair of belly knives disposed along the conveyance path and positioned to cut along and on opposing sides of the back spine a distance sufficient to separate the back fillets from the spine when the device is in use, the knives positioned so the cut they make intersects the cut made by the cutting blades; and a pelvic fin cutter having a pair of guide levers and a cutting edge, the pelvic fin cutter being located along the conveyance path so that a pelvic fin of a fish positioned on the saddle passes between the levers and engages the cutting blade.

2. A device as defined in claim 1, wherein the fish has a pelvic fin on each side of the fish, and further comprising first and second members one of which is movably mounted relative to the other member, with a cutting blade mounted to one of the first or second members, the members each having a distal end which ends are separated by a space, the members being positioned relative to the conveyance path so an upstream end of the members is closer to the path than the pelvic cutting blade, the first and second members being resiliently urged together with sufficient force so a pelvic fin entering the space between the first and second members and sliding along the members is captured between the members and cut by the pelvic cutting blade while the belly nuggets slide off the members.

3. A device as defined in claim 2, further comprising a mechanism connected to one of the members to open them.

4. A device as defined in claim 3, further comprising a supply of fluid directed toward the pelvic fin cutter under sufficient pressure to ensure removal of a severed pelvic fin from the pelvic fin blade.

5. A device as defined in claim 1, further comprising:
a first and second pair of scraper blades, each pair including a upper and lower generally parallel blades spaced vertically apart a distance sufficient to allow the ribs to pass between the blades during use, the blades being rotatable about an axis so the upper blade can engage the slit from the sickle knife and place the ribs between the blades during use of the device, each of the blades having a cutting edge with an upstream end adjacent the conveyance path and a downstream end further away from the path than the upstream end;
a cutting support along at least a portion of the cutting edges of the lower blades; and
a resilient tension rod located above at least one cutting support and aligned with at least a portion of the cutting edges of the lower blades, the rod being spaced from the cutting support a distance sufficient to allow passage of a belly flap of a fish without cutting entirely through the skin during use of the device.

6. A device as defined in claim 2, further comprising:
a first and second pair of scraper blades, each pair including a upper and lower generally parallel blades spaced vertically apart a distance sufficient to allow the ribs to pass between the blades during use, the blades being rotatable about an axis so the upper blade can engage the slit from the sickle knife and place the ribs between the blades during use of the device, each of the blades having a cutting edge with an upstream end adjacent the conveyance path and a downstream end further away from the path than the upstream end;
a cutting support along at least a portion of the cutting edges of the lower blades; and
a resilient tension rod located above at least one cutting support and aligned with at least a portion of the cutting edges of the lower blades, the rod being spaced from the cutting support a distance sufficient to allow passage of a belly flap of a fish without cutting entirely through the skin during use of the device.

7. A device as defined in claim 5, wherein the tension rod is mounted to a positioning mechanism that allows the member to be adjustably positioned along at least one translational axis and one rotational axis so a distal end of the member is substantially aligned with the cutting edge of the lower blade and spaced apart from that cutting edge by a selected distance.

8. A device as defined in claim 5, wherein the tension rod is mounted to a positioning mechanism that allows the member to be adjustably positioned along at least three translational axes and two rotational axis.

9. A device as defined in claim 1, wherein the gripping element of the conveyor comprises a plurality of non-metallic, polymer teeth removably mounted to a support plate.

10. A device as defined in claim 5, wherein the gripping element of the conveyor comprises a plurality of non-metallic, polymer teeth removably mounted to a support plate.

11. A device as defined in claim 1, wherein the dorsal fin cutters are rotably mounted to rotate about an axis generally parallel to the conveyance path to rotate into contact with the fish during use of the device, and wherein the dorsal fin cutters are rotably mounted to rotate about an axis generally perpendicular to a vertical plane through the conveyance path to cut from the tail of the fish toward the decapitated end of the fish.

12. A device as defined in claim 1, further comprising a dorsal fish guide located along the conveyance path above the fish and through which a dorsal fin of the fish will pass, the dorsal fish guide being connected to the dorsal fin cutter which in turn is mounted to move vertically with the dorsal fish guide.

13. A device for use in filleting catfish that have been decapitated, slit down the middle of the belly, eviscerated, slit down opposing sides of a back spine so the flesh is held to a skeleton of the fish by ribs that extend through the flesh, the fish having a sickle cut on opposing sides of the back spine just before the ribs begin, the fish being moved tail-first along a conveyance path, comprising:
at least one pair of scraper blades which during use of the machine separate the flesh from the ribs, each pair of blades including a upper and lower generally parallel blades spaced vertically apart a distance sufficient to allow the ribs to pass between the blades during use, each of the blades having a cutting edge such that when mounted for use in the device the blades have an upstream end adjacent the conveyance path and a downstream end further away from the path than the upstream end, the cutting edge of the lower blade being about 25% or more longer than the cutting edge of the upper cutting blade.

14. A device as defined in claim 13, wherein there are a first and second pair of scraper blades, one pair on each side of the conveyance path, each pair of scraper blades being rotatable about an axis so the upper blade can engage the slit from the sickle knife and place the ribs between the blades during use of the device, and further comprising:
a cutting support along at least a downstream end of the cutting edges of the lower blades; and
a resilient tension rod located above at least the downstream end of the cutting edges of the lower blades and generally parallel to those cutting edges, the rod being spaced from the cutting support a distance sufficient to allow passage of a belly flap of a fish without cutting entirely through the skin during use of the device.

15. A device as defined in claim 13, further comprising means cooperating with at least the lower cutting blade to produce on each half of the fish, two pieces of flesh each connected only by the skin of the fish.

16. A device as defined in claim 13, further comprising support means for supporting the lower cutting blade during separation of the flesh from the ribs to produce on each half of the fish, two pieces of flesh connected only by the skin of the fish.

17. A device as defined in claim 16, further comprising rod means for contacting an exterior surface of a belly flap interposed between the rod means and the support means to provide tension to the belly flap and help produce the two pieces of flesh connected only by the skin of the fish.

18. A device as defined in claim 14, further comprising adjustment means for positioning the tension rod about at least one translational axis and one rotational axis.

19. A device as defined in claim 17, wherein the fish has a pelvic fin on each side of the fish, and further comprising means for cutting tearing the pelvic fin from the fish as the fish is moved along the conveyance path during use of the device.

20. A device as defined in claim 17, further comprising a saddle supporting the fish, the saddle having a gripping element made of a polymer material removably mounted to a support plate.

21. A device for use in filleting fish that have been slit down the middle of the belly and eviscerated, the fish having ribs forming a belly nuggets on opposing sides of the slit, the fish having cuts on opposing sides of a back spine of the fish to separate back fillets from the spines, comprising:

a conveyor having a gripping surface configured to engage a fish, the conveyor traveling along a predetermined path, the gripping surface comprising a plurality of non-metallic, polymer teeth removable fastened to a support surface, the gripping surface having a plurality of teeth pointed in the direction the conveyor travels and configured to engage and move an eviscerated fish body during use of the device;

means for cutting along opposing sides of the ribs to separate the ribs from the nuggets and the back fillets with the back fillet and nugget on each side of the fish being connected only by skin of the fish; and means for cutting and tearing a pelvic fin from the fish during use of the machine.

22. A device as defined in claim 21, further comprising means for cutting just below a dorsal plate of the fish during use of the machine to allow removal of the dorsal plate.

23. A device for use in processing an eviscerated catfish which has ribs that have penetrated the belly flesh and have grown into the fish up to the skin to form belly nuggets on opposing sides of a slit along the belly, the fish moving tail first along a conveyance path, the fish having pelvic fins, comprising:

first and second members movable relative to each other and a cutting blade aligned with one of the first or second members, the members each having a distal end which ends are separated by a space, the members being positioned relative to the conveyance path when in use so the distal ends of the members are closer to the path than a pelvic cutting blade mounted adjacent the conveyance path so that a cutting edge of the pelvic cutting blade is adapted to engage a pelvic fin during use, the first and second members being resiliently urged together with sufficient force so a pelvic fin entering the space between the first and second members and sliding along the members is captured between the members and cut by the pelvic cutting blade while the belly nuggets slide off the members.

24. The device of claim 23, further comprising two pairs of scraper blades with each pair having an upper and lower, generally horizontal scraper blade, with the lower scraper blade having a cutting edge at least 25% longer than a cutting edge of the upper scraper blade, and a tensioning rod and a cutting support located adjacent that longer portion of the lower cutting blade so as to interpose a belly flap between the tensioning rod and cutting support during separation of the ribs from the belly flap.

25. The device of claim 23, wherein the pelvic cutting blade further comprises a blade having an inclined cutting edge at an angle of about 10–15° relative to a horizontal plane when in use, with a downwardly curved end on the cutting edge that cooperates with one of the members to prevent further downstream passage of a pelvic fin urged against the cutting edge of the pelvic cutting blade.

26. A method of filleting catfish that have been slit down the middle of the belly and eviscerated, the fish having ribs forming a belly nuggets on opposing sides of the slit, and having a cut along and on opposing sides of a back spine to separate back fillets from the spine, comprising the steps of:

placing the ribs in a predetermined position;

simultaneously cutting along opposing sides of the ribs along a length of the ribs and through any skin adjacent the end of the rib to separate the nuggets from the ribs and to separate the back fillets from the ribs, while also separating the nugget and back fillet on each side of the spine by a cut that leaves the nugget and back fillet connected only by skin of the fish; and resiliently supporting opposing surfaces of the nuggets adjacent a cutting edge of a lower cutting blade of a pair of cutting blades performing the cutting step.

27. The method of claim 26, wherein the fish has a pelvic fin on each side of the fish, and further comprising the step of removing the pelvic fin by both cutting and tearing the pelvic fin.

28. The method of claim 26, wherein prior to cutting along opposing sides of the ribs, the dorsal bone of the fish is undercut and the fish is then cut along opposing sides of the back spine of the fish a distance sufficient to intersect the cut formed by the undercutting.

29. The method of claim 28 wherein the step of cutting along the opposing sides of the back spine is performed by rotating a pair of back cutting blades, and further comprises the step of moving the rotating back cutting blades laterally apart for a portion of a dorsal plate of the fish.

30. A method as defined in claim 28, comprising the further step of conveying the fish by engaging them with replaceable, non-metallic, polymer teeth configured to engage the fish, and mounting the teeth on a planar conveyor support.

* * * * *

UNITED STATES PATENT AND TRADEMARK OFFICE
CERTIFICATE OF CORRECTION

PATENT NO. : 6,280,313 B1
DATED : August 28, 2001
INVENTOR(S) : Braeger et al.

It is certified that error appears in the above-identified patent and that said Letters Patent is hereby corrected as shown below:

<u>Title page,</u>
Item [75], Inventors, please correct the fourth inventor name which reads "Holger Jorgan", should read -- Holger Jordan --.

Signed and Sealed this

Twenty-sixth Day of November, 2002

Attest:

Attesting Officer

JAMES E. ROGAN
Director of the United States Patent and Trademark Office